United States Patent
Takahashi et al.

(10) Patent No.: US 9,617,945 B2
(45) Date of Patent: Apr. 11, 2017

(54) CONTROL DEVICE OF SPARK-IGNITION ENGINE

(71) Applicant: Mazda Motor Corporation, Aki-gun, Hiroshima (JP)

(72) Inventors: Toshiaki Takahashi, Hiroshima (JP); Junichi Taga, Higashihiroshima (JP); Kouhei Iwai, Hiroshima (JP)

(73) Assignee: Mazda Motor Corporation, Hiroshima (JP)

(*) Notice: Subject to any disclaimer, the term of this patent is extended or adjusted under 35 U.S.C. 154(b) by 383 days.

(21) Appl. No.: 14/181,505

(22) Filed: Feb. 14, 2014

(65) Prior Publication Data
US 2014/0283784 A1 Sep. 25, 2014

(30) Foreign Application Priority Data

Mar. 25, 2013 (JP) ................. 2013-062676

(51) Int. Cl.
*F02D 41/30* (2006.01)
*F02D 41/00* (2006.01)
(Continued)

(52) U.S. Cl.
CPC ..... *F02D 41/3064* (2013.01); *F02D 13/0207* (2013.01); *F02D 13/0265* (2013.01);
(Continued)

(58) Field of Classification Search
CPC ......... F02D 2041/3052; F02D 41/0057; F02D 41/3011; F02D 41/3017; F02D 41/3023;
(Continued)

(56) References Cited

U.S. PATENT DOCUMENTS 6,336,436 B1* 1/2002 Miyakubo .............. F02M 26/01
123/295
6,772,585 B2* 8/2004 Iihoshi ..................... F02B 1/12
123/295
(Continued)

FOREIGN PATENT DOCUMENTS

JP 2007154859 A 6/2007
JP 2009197740 A 9/2009
(Continued)

*Primary Examiner* — Kevin R Steckbauer
(74) *Attorney, Agent, or Firm* — Alleman Hall McCoy Russell & Tuttle LLP

(57) ABSTRACT

A control device of a spark-ignition engine is provided. The control device includes a main body of the engine, a fuel injection valve, an ignition plug, and a controller. According to an engine operating state, the controller switches between a compression-ignition mode in which compression-ignition combustion is performed, and a spark-ignition mode in which spark-ignition combustion is performed. The controller switches from the spark-ignition mode to the compression-ignition mode by performing in order, a first stage where an air-fuel ratio of mixture gas is set to a predetermined value and the spark-ignition combustion is performed, a second stage where the air-fuel ratio of the mixture gas is set leaner than the first stage and the compression-ignition combustion is performed, and a third stage where the air-fuel ratio of the mixture gas is set richer than the second stage and the compression-ignition combustion is performed.

8 Claims, 13 Drawing Sheets

(51) Int. Cl.
*F02D 41/40* (2006.01)
*F02D 13/02* (2006.01)
*F02M 26/01* (2016.01)
*F02B 29/04* (2006.01)
*F02M 31/04* (2006.01)
*F02M 26/25* (2016.01)
*F02M 26/28* (2016.01)

(52) U.S. Cl.
CPC ...... *F02D 41/0057* (2013.01); *F02D 41/3011* (2013.01); *F02D 41/402* (2013.01); *F02M 26/01* (2016.02); *F02B 29/0437* (2013.01); *F02D 41/3023* (2013.01); *F02D 41/3035* (2013.01); *F02D 2041/001* (2013.01); *F02D 2041/3052* (2013.01); *F02M 26/25* (2016.02); *F02M 26/28* (2016.02); *F02M 31/04* (2013.01); *Y02T 10/18* (2013.01); *Y02T 10/44* (2013.01); *Y02T 10/47* (2013.01)

(58) Field of Classification Search
CPC ............ F02D 41/3035; F02D 41/3064; F02D 41/3029; F02D 41/307
USPC ................................. 701/103, 104, 105, 108
See application file for complete search history.

(56) References Cited

U.S. PATENT DOCUMENTS

| | | | | |
|---|---|---|---|---|
| 7,370,616 B2 * | 5/2008 | Kuo | ........................ | F01L 1/344 123/568.14 |
| 7,478,620 B2 * | 1/2009 | Kuo | .................... | F02D 13/0211 123/294 |
| 7,669,578 B2 * | 3/2010 | Yamashita | ............... | F02B 17/00 123/295 |
| 7,720,590 B2 * | 5/2010 | Kuzuyama | ................ | F02B 1/12 123/295 |
| 7,748,355 B2 * | 7/2010 | Megli | ........................ | F01L 9/04 123/90.15 |
| 7,832,370 B2 * | 11/2010 | Sutherland | ........... | F01L 13/0015 123/143 A |
| 7,848,869 B2 * | 12/2010 | Kakuya | ............... | F02D 13/0265 123/295 |
| 7,874,280 B2 * | 1/2011 | Kuzuyama | .......... | F02D 41/0027 123/295 |
| 7,918,205 B2 * | 4/2011 | Wermuth | .................. | F02B 1/06 123/295 |
| 7,963,268 B2 * | 6/2011 | Kang | ........................ | F01L 1/34 123/294 |
| 7,971,564 B2 * | 7/2011 | Kuzuyama | ................ | F02B 1/12 123/184.21 |
| 8,290,686 B2 * | 10/2012 | Kang | ...................... | F01L 1/344 123/305 |
| 8,347,849 B2 * | 1/2013 | Wermuth | .................. | F02B 1/06 123/295 |
| 8,464,687 B2 * | 6/2013 | Kakuya | ............... | F02D 41/3035 123/305 |
| 8,522,730 B2 * | 9/2013 | Kuzuyama | ................ | F02B 1/12 123/27 R |
| 2003/0061803 A1 * | 4/2003 | Iihoshi | ...................... | F02B 1/12 60/285 |
| 2003/0192305 A1 * | 10/2003 | Iihoshi | ...................... | F02B 1/12 60/277 |
| 2008/0271688 A1 * | 11/2008 | Wermuth | .................. | F02B 1/06 123/90.16 |
| 2008/0283006 A1 * | 11/2008 | Sutherland | .......... | F01L 13/0015 123/90.15 |
| 2009/0095250 A1 * | 4/2009 | Kuzuyama | ................ | F02B 1/12 123/27 R |
| 2009/0099751 A1 * | 4/2009 | Kuzuyama | ................ | F02B 1/12 701/102 |
| 2009/0229564 A1 * | 9/2009 | Kang | ........................ | F01L 1/34 123/295 |
| 2009/0229565 A1 * | 9/2009 | Kang | ...................... | F01L 1/344 123/295 |
| 2010/0145594 A1 * | 6/2010 | Wermuth | .................. | F02B 1/06 701/102 |
| 2011/0270505 A1 * | 11/2011 | Chaturvedi | ......... | F02D 41/1498 701/102 |
| 2012/0055445 A1 * | 3/2012 | Kakuya | ............... | F02D 41/3035 123/305 |
| 2014/0352670 A1 * | 12/2014 | Surnilla | ................ | F02M 26/06 123/568.12 |

FOREIGN PATENT DOCUMENTS

| JP | 2011202590 A | 10/2011 |
|---|---|---|
| JP | 2012172664 A | 9/2012 |

* cited by examiner

CONTROL DEVICE OF SPARK-IGNITION ENGINE

BACKGROUND

The present invention relates to a control device of a spark-ignition engine.

Prior art approaches for improving both an exhaust emission performance and a thermal efficiency are known. For example, JP2007-154859A discloses using a combustion mode of compressing to ignite mixture gas inside a cylinder. However, compression-ignition combustion occurs with a significant increase in pressure as the engine load increases, causing an increase in combustion noises. Thus, as disclosed in JP2007-154859A, even with engines which perform compression-ignition combustion, within an operating range on a high engine load side, instead of compression-ignition combustion, spark-ignition combustion by operation of an ignition plug has generally been performed.

JP2009-197740A discloses an engine which performs compression-ignition combustion within a low engine load operating range with low engine speed similarly to the engine disclosed in JP2007-154859A. With the engine, within the compression-ignition combustion performing range, open periods of intake and exhaust valves are adjusted to leave burned gas at a high temperature inside a cylinder so that the in-cylinder temperature is increased to stimulate the compression-ignition combustion. Whereas, within a part of the compression-ignition combustion performing range where the engine load is relatively high and the engine speed is relatively high, the open timing of an intake valve is advanced so that burned gas inside the cylinder is blown back to the intake port side once and then introduced into the cylinder again along with fresh air. In this manner, the temperature of the burned gas decreases because of the fresh air, and thus, within the relatively high-engine-speed high-engine-load range where the temperature and the pressure at the end of compression stroke become high, the significant pressure increase due to the compression-ignition combustion can be suppressed.

Meanwhile, in spark-ignition combustion, since thermal efficiency is relatively low, the combusting gas temperature increases. Whereas, in compression-ignition combustion, as described in JP2007-154859A and JP2009-197740A, the high-temperature burned gas is introduced into the cylinder to secure the ignitability. Therefore, with engines in which the combustion mode is switched according to the engine operating state, a temperature environment inside the cylinder is comparatively high and the high-temperature burned gas produced by the spark-ignition combustion is introduced into the cylinder immediately after the spark-ignition combustion is switched to the compression-ignition combustion, resulting in an excessive increase in the in-cylinder temperature. This excessive increase may cause pre-ignition such that the mixture gas within the cylinder is compressed to ignite in, for example, a compression-stroke period, and a pressure increase rate ($dP/d\theta$) inside the cylinder may become significantly high to cause loud combustion noises.

Note that switching from spark-ignition combustion to compression-ignition combustion is not limited to be performed according to the engine load decrease, but may also be performed while the engine load is stable, as well as when an engine temperature increases from a cold-start state to a warmed-up state and under other circumstances.

SUMMARY

The present invention is made in view of the above situations and avoids an increase in combustion noises when switching from spark-ignition combustion to compression-ignition combustion.

In the present invention, when switching from spark-ignition combustion to compression-ignition combustion, a combustion mode for making an air-fuel ratio of mixture gas relatively lean to decrease the exhaust gas temperature intervenes. Thus, immediately after the combustion is switched to the compression-ignition combustion, the in-cylinder temperature when the exhaust gas is introduced into the cylinder is decreased, and therefore, pre-ignition of the mixture gas is avoided to prevent generation of combustion noises.

Specifically, one aspect of the present invention provides a control device of a spark-ignition engine. The control device includes a main body of the engine having a cylinder, a fuel injection valve for injecting fuel to be supplied into the cylinder, an ignition plug for igniting mixture gas within the cylinder, and a controller for operating the engine by controlling at least the fuel injection valve and the ignition plug.

According to an operating state of the engine, the controller switches an ignition mode between a compression-ignition mode in which compression-ignition combustion is performed by causing the mixture gas to self-ignite and combust, and a spark-ignition mode in which spark-ignition combustion is performed by igniting the mixture gas with the ignition plug to combust the mixture gas. The controller switches the ignition mode from the spark-ignition mode to the compression-ignition mode by performing in order, a first stage where an air-fuel ratio of the mixture gas is set to a predetermined value and the spark-ignition combustion is performed, a second stage where the air-fuel ratio of the mixture gas is set leaner than the first stage and the compression-ignition combustion is performed, and a third stage where the air-fuel ratio of the mixture gas is set richer than the second stage and the compression-ignition combustion is performed.

Here, "the first stage" may be the stage where the spark-ignition mode before the mode switching is performed. Similarly, the "third stage" may be the stage where the compression-ignition mode after the mode switching is performed. The "second stage" can be said to be the transition mode intervening between the spark-ignition mode and the compression-ignition mode when switching from the spark-ignition mode to the compression-ignition mode. The second stage which is the transition mode may be performed over one engine cycle or continuously over a plurality of engine cycles.

With this configuration, when switching from the spark-ignition mode to the compression-ignition mode, the second stage where the air-fuel ratio (A/F) of the mixture gas is relatively lean compared to that in the first cycle and the compression-ignition combustion is performed, is performed between the first stage where the spark-ignition combustion is performed and the third stage where the compression-ignition combustion is performed. In the second stage, by setting the A/F of the mixture gas lean, the gas amount with respect to the fuel amount is increased, and therefore, a temperature of combusting gas is decreased compared to the first stage. As a result, a temperature of exhaust gas is decreased. Moreover, in the second stage, since the compression-ignition combustion is performed, also by this, the temperature of the exhaust gas can be decreased compared to the first stage where the spark-ignition combustion is performed. As a result, in the third stage following the second stage, the temperature inside the cylinder may be low, and in a case of introducing the exhaust gas into the cylinder, the exhaust gas with relatively low temperature produced in the second stage is introduced into the cylinder. Thus, in the third cycle, pre-ignition caused by the mixture gas inside the cylinder can be avoided, and the mixture gas can be compressed to ignition at a suitable timing. In other words, when switching from the spark-ignition mode to the compression-ignition mode, by performing the transition control in which the first to third stages are performed in this order, a rapid increase in pressure can be avoided, and as a result, an increase in combustion noises can be avoided as well.

The control device may also include an internal exhaust gas recirculation (EGR) adjuster for adjusting an exhaust gas amount remaining within the cylinder in a period from exhaust stroke to intake stroke by controlling at least one of an exhaust valve and an intake valve provided in the main body of the engine. In the first and second stages, the controller may stop the operation of the internal EGR adjuster to reduce the exhaust gas amount remaining within the cylinder, and in the third stage, the controller may operate the internal EGR adjuster to increase the exhaust gas amount remaining within the cylinder.

Here, the "internal EGR adjuster" may adopt any method including an exhaust open-twice control in which the exhaust valve is also opened on the intake stroke, an intake open-twice control in which the intake valve is also opened on the exhaust stroke, and a negative overlap control in which the exhaust and intake valves are both closed near an exhaust top dead center. As described above, in a case of adopting the configuration of switching a cam of the intake valve when shifting from the first stage to the second stage, by adopting a configuration of switching a cam of the exhaust valve and starting the exhaust open-twice control when shifting from the second stage to the third stage, the transition control including the first to third stages becomes advantageous by performing smoothly and with high responsiveness.

With the configuration described above, as a result of the internal EGR adjuster being operated in the third stage, the exhaust gas amount remaining within the cylinder from the exhaust stroke to the intake stroke is increased. Since the temperature of the exhaust gas is decreased in the second stage as described above, the temperature inside the cylinder is adjusted to a temperature at which the compression-ignition combustion can be performed stably. Thus, the switch from the spark-ignition mode to the compression-ignition mode is completed. On the other hand, in the first and second stages, by stopping the operation of the internal EGR adjuster, not only in the first stage where the temperature inside the cylinder is not required to be high to perform the spark-ignition combustion, but also in the second stage following the first stage, the exhaust gas amount remaining within the cylinder from the exhaust stroke to the intake stroke (i.e., the exhaust gas with comparatively high temperature discharged in the first stage where the spark-ignition combustion is performed) is reduced to substantially zero, and thus, an excessive increase of the temperature inside the cylinder can be avoided. This is advantageous in suppressing pre-ignition in the second stage where the compression-ignition combustion is performed.

The control device may also include an intake valve operating mechanism for operating an intake valve provided in the main body of the engine. The intake valve operating mechanism may be operated in either one of a first mode in which the intake valve is opened and closed with a first lift property and a second mode in which the intake valve is opened and closed with a second lift property. With the first lift property, a fresh air amount may be relatively regulated, and with the second lift property, the fresh air amount may be increased compared to that with the first lift property. The controller may increase an amount of intake air into the cylinder by operating the intake valve in the first mode in the first stage and operating the intake valve in the second mode in the second stage.

Specifically, in the first stage, by operating the intake valve in the first mode, the amount of fresh air introduced into the cylinder is relatively regulated, whereas in the second stage, the amount of fresh air introduced into the cylinder is increased by switching to the second mode. As a result, the air-fuel ratio of the mixture gas may be leaner than the first stage when the stage is shifted to the proceeding second stage. Such an intake valve operating mechanism may include a cam switching mechanism for switching between a large lift cam having a relatively large lift and, thereby, a long open period (corresponding to the first lift property), and a small lift cam having a relatively small lift and, thereby, a short open period (corresponding to the second lift property). In other words, by switching from the large lift cam to the small lift cam, a close timing of the intake valve can be changed instantly from a late timing after an intake bottom dead center (IBDC) to near the IBDC, and as a result, in the second stage, the amount of fresh air introduced into the cylinder can be increased. This is particularly effective in increasing the responsiveness of the transition control including the first to third stages, and performing the transition control smoothly.

The controller may set the air-fuel ratio of the mixture gas to a theoretical air-fuel ratio in the spark-ignition mode including the first stage.

Here, setting the air-fuel ratio of the mixture gas to the theoretical air-fuel ratio includes setting the air-fuel ratio to the substantial theoretical air-fuel ratio (i.e., the air excess ratio $\lambda \approx 1$). For example, the air-fuel ratio of the mixture gas may be set within a range where a desired purifying ratio can be secured with a three-way catalyst, and specifically, the air-fuel ratio=14.7±0.5:1. Specifically, in the spark-ignition mode including the first stage, by setting the air-fuel ratio of the mixture gas to the theoretical air-fuel ratio, the three-way catalyst can be used. On the other hand, in the second stage, the air-fuel ratio of the mixture gas becomes leaner than the theoretical ratio; however, in the second stage, by performing the compression-ignition combustion, a desired exhaust emission performance can be secured without utilizing the three-way catalyst.

The controller may perform the first to third stages in this order in a case of switching from the spark-ignition mode where an engine load is at a predetermined high load, to the compression-ignition mode where the engine load is lower than the predetermined high load.

When the engine load is high, due to the increase in the fuel amount, the temperature inside the cylinder may be increased and the temperature of the exhaust gas may also be increased. Therefore, when switching from the spark-ignition mode where the engine load is at the predetermined high load, to the compression-ignition mode where the engine load is lower than the predetermined high load, pre-ignition easily occurs; however, by performing the transition control in which the first to third stages are performed in this order, pre-ignition can be avoided when switching modes.

Moreover, when shifting from the high engine load state to the low engine load state, a high torque is not required.

Therefore, in the second stage, the air-fuel ratio of the mixture gas can be set significantly lean, which enables a larger decrease of the temperature of the exhaust gas and becomes advantageous in avoiding combustion noises.

The controller may perform the first to third stages in this order in a case of switching from the spark-ignition mode where an engine load is at a predetermined low load, to the compression-ignition mode where the engine load is at the predetermined low load.

Here, specific examples of the switching from the spark-ignition mode with the low engine load to the compression-ignition mode with the low engine load include switching from the spark-ignition mode to the compression-ignition mode due to the temperature state of the engine shifting from a cold-start to a warmed-up state, switching from the spark-ignition mode to the compression-ignition mode due to the operating state of the engine shifting from an idle state to the operating state other than the idle state, and switching from the spark-ignition mode to the compression-ignition mode in a case where a fuel cut is performed when the vehicle decelerates, the fuel supply is started in the spark-ignition mode in view of combustion stability, and then the mode is returned to the normal compression-ignition mode. In other words, the examples include various other circumstances in which the spark-ignition mode is switched to the compression-ignition mode without substantially changing the engine load. Even in such a case of switching from the spark-ignition mode with the low engine load to the compression-ignition mode with the low engine load, the transition control in which the first to third stages are performed in this order is advantageous in avoiding the increase in combustion noises.

The control device may also include an external EGR adjuster for circulating exhaust gas discharged from the cylinder to the intake side. When switching from the spark-ignition mode where the external EGR adjuster is operated to the compression-ignition mode, the controller may stop the operation of the external EGR adjuster in the second stage and increase the number of engine cycles of the second stage compared to that when switching from the spark-ignition mode where the external EGR adjuster is not operated to the compression-ignition mode.

When the engine load is at a predetermined low load, the controller may control the ignition mode to be the spark-ignition mode where the external EGR adjuster is not operated, and when the engine load is at a predetermined high load, the controller may control the ignition mode to be the spark-ignition mode where the external EGR adjuster is operated.

The external EGR adjuster normally circulates the exhaust gas discharged from the cylinder back to the intake side, via an EGR passage. Therefore, even if the operation of the external EGR adjuster is stopped, the exhaust gas remaining in the EGR passage or the like is introduced into the intake side. In other words, since the external EGR adjuster has comparatively low control responsiveness, when switching from the spark-ignition mode where the external EGR adjuster is operated, to the compression-ignition mode, even after the operation of the external EGR adjuster is stopped in the second stage, the exhaust gas with the comparatively high temperature produced in the spark-ignition mode is introduced into the intake side, and the temperature inside the cylinder may continue to be high.

Thus, when switching from the spark-ignition mode where the external EGR adjuster is operated to the compression-ignition mode, the number of engine cycles of the second stage is increased compared to that when switching from the spark-ignition mode where the external EGR adjuster is not operated to the compression-ignition mode. By this procedure, the second stage can be shifted to the third stage after the temperature inside the cylinder is sufficiently decreased in the second stage. Thus, pre-ignition of the mixture gas can surely be avoided, and the combustion noises produced when switching from the spark-ignition mode to the compression-ignition mode can surely be avoided.

On the other hand, when switching from the spark-ignition mode where the external EGR adjuster is not operated to the compression-ignition mode, the switch from the spark-ignition mode to the compression-ignition mode is swiftly completed.

DETAILED DESCRIPTION OF EMBODIMENT

Figure 1:
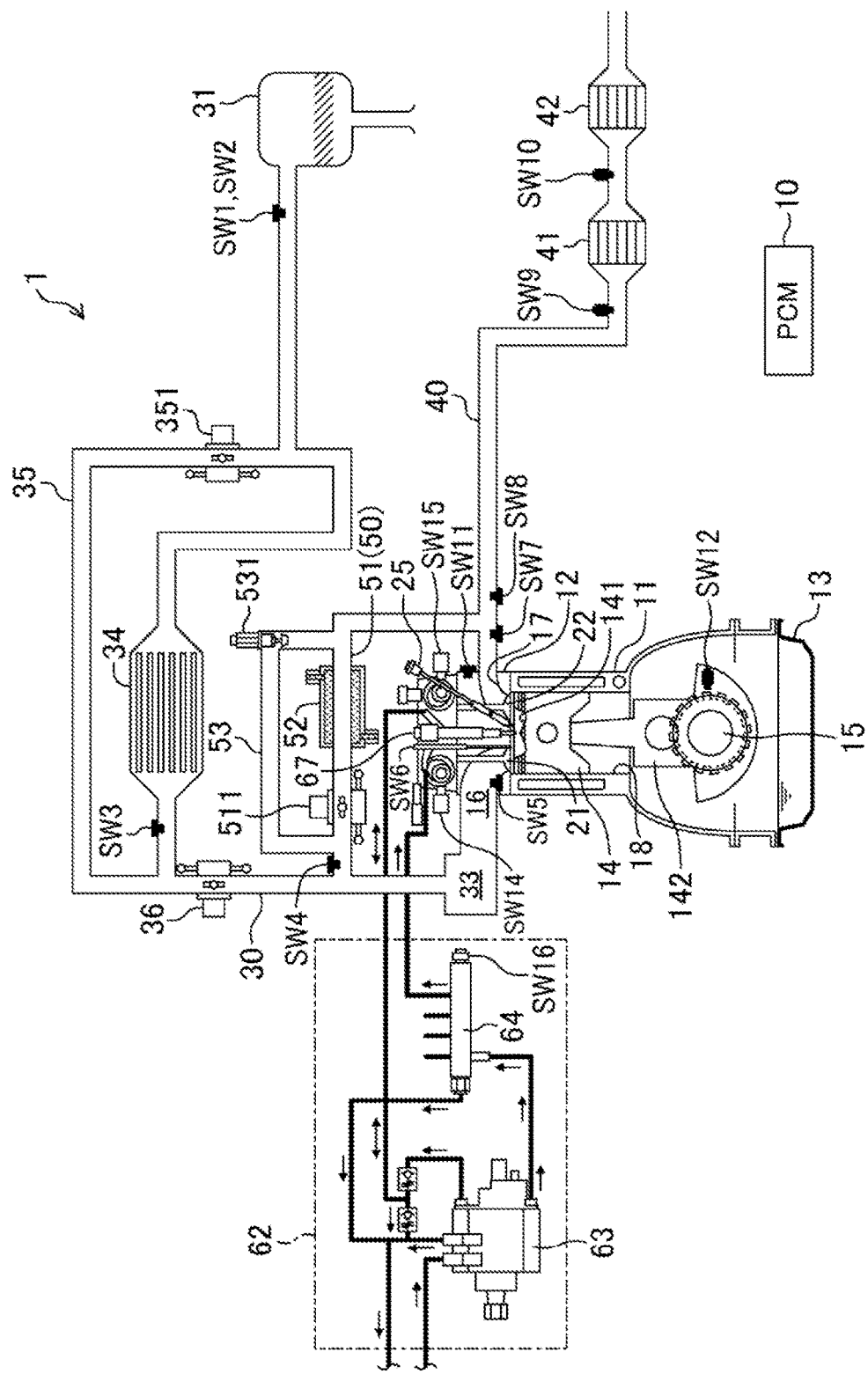
FIG. 1 is a schematic diagram illustrating a configuration of a spark-ignition engine.
Figure 2:
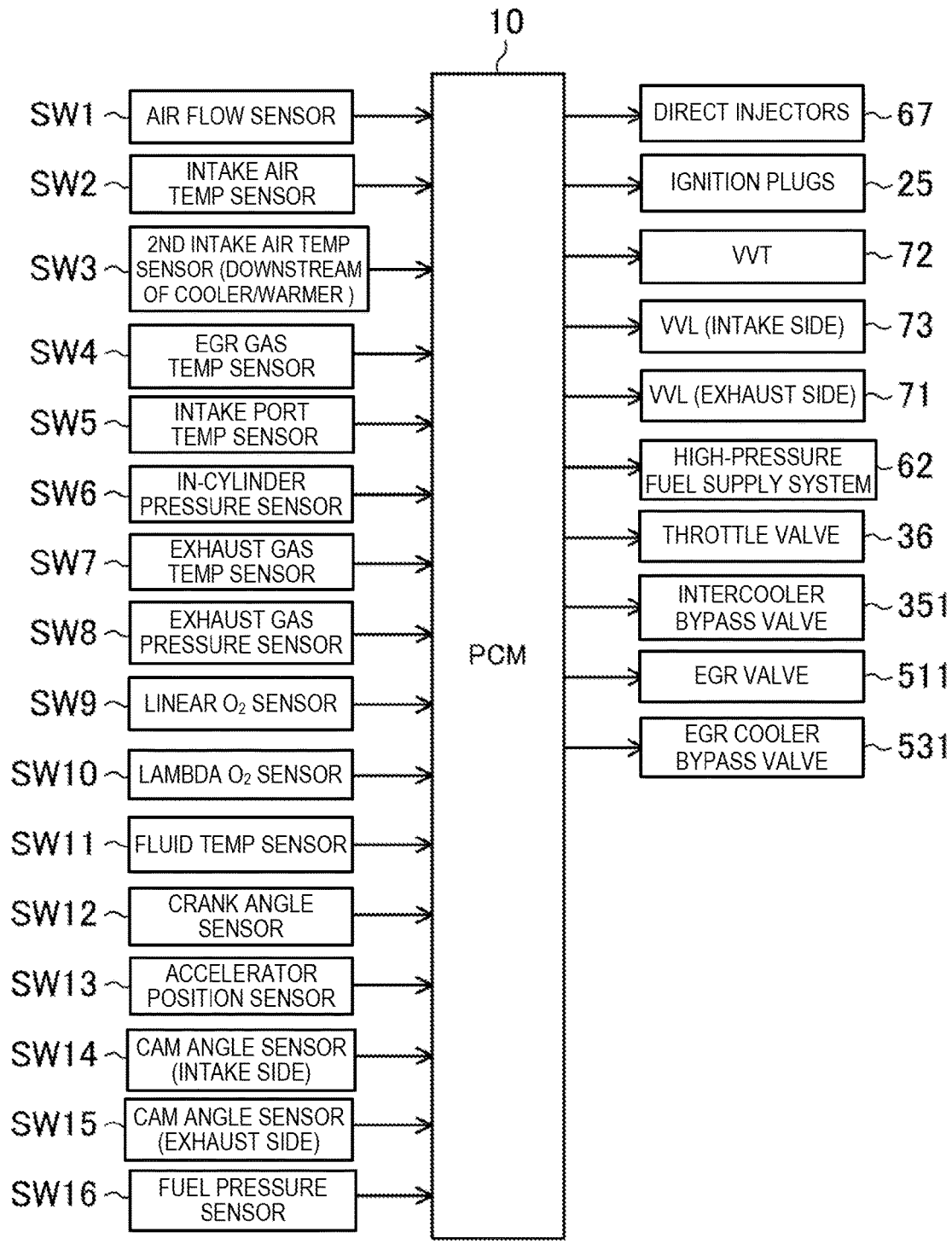
FIG. 2 is a block diagram relating to a control of the spark-ignition engine.
Figure 3:
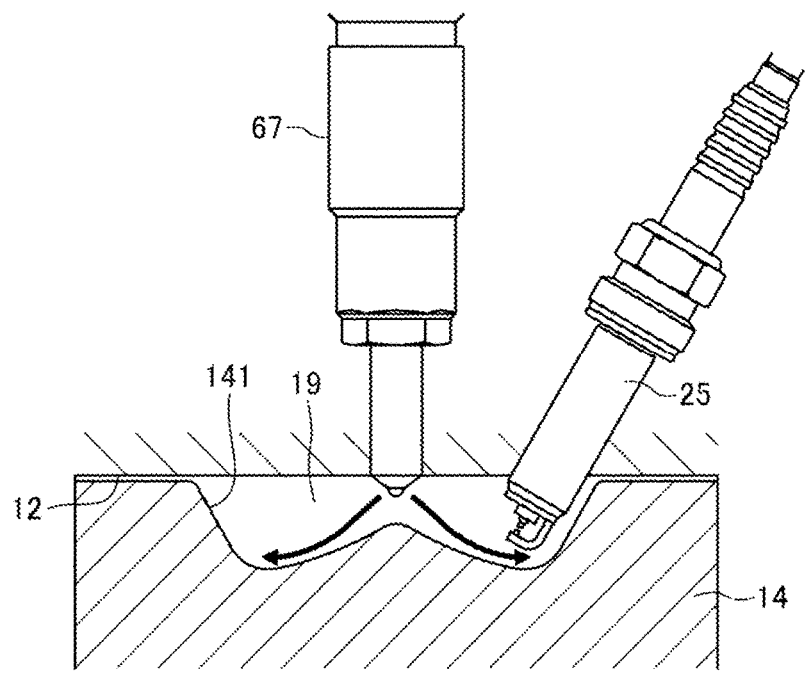
FIG. 3 is a cross-sectional view illustrating a combustion chamber in an enlarged manner.

Hereinafter, a spark-ignition engine according to one embodiment of the present invention is described in detail with reference to the appended drawings. The following description of the preferred embodiment is an illustration. FIGS. 1 and 2 illustrate a schematic configuration of an engine 1 (engine body) of this embodiment. The engine 1 is a spark-ignition gasoline engine that is equipped in a vehicle and supplied with fuel containing at least gasoline. The engine 1 includes a cylinder block 11 provided with a plurality of cylinders 18 (note that, although only one cylinder is illustrated in FIG. 1, four cylinders are linearly provided in this embodiment), a cylinder head 12 disposed on the cylinder block 11, and an oil pan 13, disposed below the cylinder block 11, where a lubricant is stored. Inside the cylinders 18, reciprocatable pistons 14 coupled to a crankshaft 15 via respective connecting rods 142 are fitted. As illustrated in FIG. 3 in an enlarged manner, a cavity 141 having a reentrant shape, such as the shape generally used in a diesel engine, is formed on a top face of each piston 14. When the piston 14 is at a position near a compression top dead center (CTDC), the cavity 141 faces toward an injector 67 described later. The cylinder head 12, the cylinders 18, and the pistons 14 each formed with the cavity 141 partition combustion chambers 19. Note that the shape of the combustion chamber 19 is not limited to the shape in the drawings. For example, the shape of the cavity 141, the shape of the top face of the piston 14, and the shape of a ceiling part of the combustion chamber 19 may suitably be changed.

A geometric compression ratio of the engine 1 is set comparatively high as 15:1 or above so as to improve a theoretical thermal efficiency and stabilize compression-ignition combustion (described later). Note that the geometric compression ratio may suitably be set within a range of 15:1 to about 20:1. For example, the geometric compression ratio of the engine 1 of this embodiment is 18:1.

In the cylinder head 12, each of the cylinders 18 is formed with an intake port 16 and an exhaust port 17, and disposed with an intake valve 21 for opening and closing the intake port 16 on the combustion chamber 19 side and an exhaust valve 22 for opening and closing the exhaust port 17 on the combustion chamber 19 side.

In a valve train system of the engine 1 for operating the intake and exhaust valves 21 and 22, for example, a hydraulically-actuated variable valve mechanism 71 (see FIG. 2, hereinafter, may be referred to as the VVL (Variable Valve Lift)) for switching an operation mode of the exhaust valve 22 between a normal mode and a special mode is provided on an exhaust side. The VVL 71 (the detailed configuration is not illustrated) on the exhaust side (exhaust VVL) includes two kinds of cams with different cam profiles in which a first cam has one cam nose and a second cam has two cam noses; and a lost motion mechanism for selectively transmitting an operating state of either one of the first and second cams to the exhaust valve. While the lost motion mechanism transmits the operating state of the first cam to the exhaust valve 22, the exhaust valve 22 operates in the normal mode where it opens only once during exhaust stroke. On the other hand, while the lost motion mechanism transmits the operating state of the second cam to the exhaust valve 22, the exhaust valve 22 operates in the special mode, which is a so-called exhaust open-twice control, where it opens once during the exhaust stroke and once more during an intake stroke (see FIG. 7, etc.). The normal and special modes of the exhaust VVL 71 are switched therebetween according to an operating state of the engine. Specifically, the special mode is utilized for a control related to an internal EGR. Hereinafter, the processing of operating the exhaust VVL 71 in the normal mode where the exhaust open-twice control is not performed may be referred to as "turning the VVL 71 off," and the processing of operating the exhaust VVL 71 in the special mode where the exhaust open-twice control is performed may be referred to as "turning the VVL 71 on."

Here, the exhaust open-twice control includes, in addition to a lift property in which the exhaust valve 22 is substantially closed on the exhaust stroke and then opened again on the intake stroke (i.e., the lift property in which two noses of a lift curve of the exhaust valve 22 align in a progressing direction of a crank angle), a lift property in which the exhaust valve 22 lifted on the exhaust stroke once maintains a predetermined opening until the intake stroke without being closed (i.e., the lift property in which although the nose of the lift curve of the exhaust valve 22 is substantially one, the foot part of the nose extends in the progressing direction of the crank angle). Note that in enabling the switching between the normal mode and the special mode, an electromagnetic valve train system which operates the exhaust valve 22 with an electromagnetic actuator may be adopted.

Moreover, the execution of the internal EGR is not limited to be achieved by the exhaust open-twice control only. For example, the internal EGR control may be performed by an intake open-twice control in which the intake valve 21 opens twice. Similarly to the exhaust open-twice control, the intake open-twice control includes, in addition to a lift property in which the intake valve 21 is substantially closed on the exhaust stroke and then opened again on the intake stroke (i.e., the lift property in which two noses of the lift curve of the intake valve 21 align in a progressing direction of the crank angle), a lift property in which the intake valve 21 lifted on the exhaust stroke once maintains a predetermined opening until the intake stroke without being closed (i.e., the lift property in which although the nose of the lift curve of the intake valve 21 is substantially one, the foot part of the nose extends in an opposite direction to the progressing direction of the crank angle). Moreover, an internal EGR control may be performed in which burned gas remains inside the cylinder 18 by providing a negative overlap period in which both the intake and exhaust valves 21 and 22 are closed on the exhaust stroke or the intake stroke.

An intake side of the valve train system includes a VVL 73 similarly to the exhaust side of the valve train system provided with the VVL 71. Note that the VVL 73 on the intake side (intake VVL), differently from the VVL 71 on the exhaust side, includes two kinds of cams with different cam profiles in which a large lift cam relatively increases the lift of the intake valve 21 and a small lift cam relatively reduces the lift of the intake valve 21; and a lost motion mechanism for selectively transmitting an operating state of either one of the large and small lift cams to the intake valve 21. While the lost motion mechanism transmits the operating state of the large lift cam to the intake valve 21, the intake valve 21 opens with a relatively large lift, and an open period thereof is long. On the other hand, while the lost motion mechanism transmits the operating state of the small lift cam to the intake valve 21, the intake valve 21 opens with a relatively small lift, and the open period thereof is long (see FIG. 7, etc.). Moreover, as illustrated in FIG. 2, a phase variable mechanism 72 (hereinafter, may be referred as the VVT (Variable Valve Timing)) for changing a rotational phase of an intake camshaft with respect to the crankshaft 15 is provided on the intake side of the valve train system. A known hydraulic, electromagnetic, or mechanical structure may suitably be adopted for the VVT 72 (a detailed structure is not illustrated). The open and close timings and the lift of the intake valve 21 can be changed by the VVT 72 and the VVL 73, respectively.

For each cylinder 18, the injector 67 for directly injecting the fuel into the cylinder 18 is attached to the cylinder head 12. As illustrated in an enlarged manner in FIG. 3, a nozzle hole of the injector 67 is arranged in a center portion of the ceiling face of the combustion chamber 19 to be oriented toward the inside of the combustion chamber 19. The injector 67 directly injects the fuel into the combustion chamber 19 by an amount according to the operating state of the engine 1 at an injection timing set according to the operating state of the engine 1. In this embodiment, the injector 67 (a detailed configuration is not illustrated) is a multi hole injector formed with a plurality of nozzle holes. Thus, the injector 67 injects the fuel so that the fuel spray spreads radially from the center portion of the combustion chamber 19. As indicated by the arrows in FIG. 3, at a timing when the piston 14 reaches near the CTDC, the fuel spray injected to spread radially from the center portion of the combustion chamber 19 flows along a wall surface of the cavity 141 formed on the piston top face. Therefore, it may be said that the cavity 141 is formed to contain therewithin the fuel spray injected at the timing when the piston 14 reaches near the CTDC. The combination of the multi hole injector 67 and the cavity 141 is advantageous in, after the fuel is injected, shortening a mixture gas forming period and the combustion period. Note that the injector 67 is not limited to the multi hole injector, and may be an outward opening valve type injector.

A fuel supply path couples between a fuel tank (not illustrated) and the injectors 67. A fuel supply system 62 for supplying the fuel to each of the injectors 67 at a comparatively high fuel pressure and having a fuel pump 63 and a common rail 64 is provided within the fuel supply path. The fuel pump 63 pumps the fuel from the fuel tank to the common rail 64, and the common rail 64 can accumulate the pumped fuel at a comparatively high fuel pressure. By opening the nozzle holes of the injector 67, the fuel accumulated in the common rail 64 is injected from the nozzle holes of the injector 67. Here, the fuel pump 63 is a plunger type pump (not illustrated) and is operated by the engine 1. The fuel supply system 62 including the engine-operated pump enables the supply of fuel to the injector 67 at a high fuel pressure of 30 MPa or above. The fuel pressure may be set to about 120 MPa at the maximum. As described later, the pressure of the fuel supplied to the injector 67 is changed according to the operating state of the engine 1. Note that the fuel supply system 62 is not limited to the above configuration.

Further, as illustrated in FIG. 3, an ignition plug 25 for igniting mixture gas inside the combustion chamber 19 is attached to the cylinder head 12 for each cylinder 18. In this embodiment, the ignition plug 25 is arranged penetrating the cylinder head 12 so as to extend obliquely downward from the exhaust side of the engine 1. As illustrated in FIG. 3, a tip of the ignition plug 25 is oriented toward the inside of the cavity 141 of the piston 14 at the CTDC.

On one side surface of the engine 1, as illustrated in FIG. 1, an intake passage 30 is connected to communicate with the intake port 16 of each cylinder 18. On the other side surface of the engine 1, an exhaust passage 40 is connected to guide out the burned gas (exhaust gas) discharged from each of the combustion chambers 19 of the cylinders 18.

An air cleaner 31 for filtrating intake air is disposed in an upstream end part of the intake passage 30. A surge tank 33 is disposed near a downstream end of the intake passage 30. A part of the intake passage 30 downstream of the surge tank 33 is branched to be independent passages extending toward the respective cylinders 18, and downstream ends of the independent passages are connected with the intake ports 16 of the cylinders 18, respectively.

A water-cooled type intercooler/warmer 34 for cooling or heating air and a throttle valve 36 for adjusting an intake air amount to each cylinder 18 are disposed between the air cleaner 31 and the surge tank 33 in the intake passage 30. Moreover, an intercooler bypass passage 35 for bypassing the intercooler/warmer 34 is connected to the intake passage 30, and an intercooler bypass valve 351 for adjusting an air flow rate passing through the passage 35 is disposed within the intercooler bypass passage 35. A ratio of a flow rate within the intercooler bypass passage 35 with a flow rate within the intercooler/warmer 34 is adjusted through controlling an opening of the intercooler bypass valve 351, and thus, a temperature of fresh air to be introduced into the cylinder 18 can be adjusted.

An upstream part of the exhaust passage 40 includes an exhaust manifold. The exhaust manifold has independent passages branched toward the respective cylinders 18 and connected with respective external ends of the exhaust ports 17, and a manifold section where the independent passages merge together. In a part of the exhaust passage 40 on the downstream side of the exhaust manifold, a direct catalyst 41 and an underfoot catalyst 42 are connected as an exhaust emission control system for purifying hazardous components contained in the exhaust gas. Each of the direct catalyst 41 and the underfoot catalyst 42 includes a cylindrical case and, for example, a three-way catalyst disposed in a flow path within the case.

A part of the intake passage 30 between the surge tank 33 and the throttle valve 36 is connected with a part of the exhaust passage 40 on the upstream side of the direct catalyst 41 via an EGR passage 50 for circulating a part of the exhaust gas back to the intake passage 30. The EGR passage 50 includes a main passage 51 disposed with an EGR cooler 52 for cooling the exhaust gas by an engine coolant, and an EGR cooler bypass passage 53 for bypassing the EGR cooler 52. An EGR valve 511 for adjusting a circulation amount of the exhaust gas to the intake passage 30 is disposed within the main passage 51. An EGR cooler bypass valve 531 for adjusting a flow rate of the exhaust gas flowing through the EGR cooler bypass passage 53 is disposed within the EGR cooler bypass passage 53.

The engine 1 with the configuration described as above is controlled by a powertrain control module 10 (hereinafter, may be referred to as the PCM). The PCM 10 is comprised of a microprocessor including a CPU, a memory, a counter timer group, an interface, and paths for connecting these units. The PCM 10 may alternatively be referred to as a controller.

As illustrated in FIGS. 1 and 2, detection signals of various kinds of sensors SW1 to SW16 are inputted to the PCM 10. The various kinds of sensors include the following sensors: an air flow sensor SW1 for detecting the flow rate of the fresh air and an intake air temperature sensor SW2 for detecting the temperature of the fresh air that are arranged on the downstream side of the air cleaner 31; a second intake air temperature sensor SW3, arranged on the downstream side of the intercooler/warmer 34, for detecting the temperature of the fresh air after passing through the intercooler/warmer 34; an EGR gas temperature sensor SW4, arranged near a connecting part of the EGR passage 50 with the intake passage 30, for detecting a temperature of external EGR gas; an intake port temperature sensor SW5, attached to the intake port 16, for detecting the temperature of the intake air immediately before flowing into the cylinder 18; an in-cylinder pressure sensor SW6, attached to the cylinder head 12, for detecting the pressure inside the cylinder 18; an exhaust gas temperature sensor SW7 and an exhaust gas pressure sensor SW8, arranged near a connecting part of the exhaust passage 40 with the EGR passage 50, for detecting the exhaust gas temperature and pressure, respectively; a linear $O_2$ sensor SW9, arranged on the upstream side of the direct catalyst 41, for detecting an oxygen concentration within the exhaust gas; a lambda $O_2$ sensor SW10, arranged between the direct catalyst 41 and the underfoot catalyst 42, for detecting an oxygen concentration within the exhaust gas; a fluid temperature sensor SW11 for detecting a temperature of the engine coolant; a crank angle sensor SW12 for detecting a rotational angle of the crankshaft 15; an accelerator position sensor SW13 for detecting an accelerator opening corresponding to an angle of an acceleration pedal (not illustrated) of the vehicle; an intake cam angle sensor SW14 and an exhaust cam angle sensor SW15; and a fuel pressure sensor SW16, attached to the common rail 64 of the fuel supply system 62, for detecting the fuel pressure to be supplied to the injector 67.

By performing various kinds of operations based on these detection signals, the PCM 10 determines the state of the engine 1 and further the vehicle, and outputs control signals to the injectors 67, the ignition plugs 25, the VVT 72 and the intake VVL 73, the exhaust VVL 71, the fuel supply system 62, and the actuators of the various kinds of valves (the throttle valve 36, the intercooler bypass valve 351, the EGR valve 511, and the EGR cooler bypass valve 531), according to the determined state. In this manner, the PCM 10 operates the engine 1.

Figure 4:
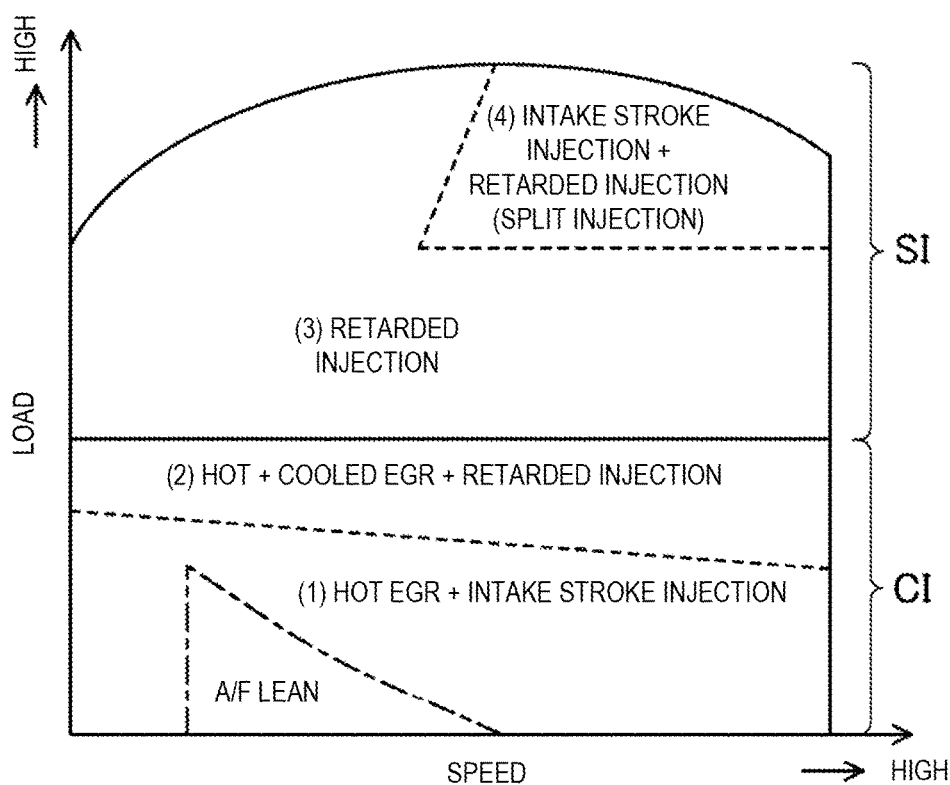
FIG. 4 is a chart exemplifying an operating range of the engine.

FIG. 4 illustrates one example of an operating range of the engine 1 in a warmed-up state. Within a low engine load range where an engine load is relatively low, the engine 1 performs compression-ignition combustion by a combustion generated from a compression self-ignition without performing an ignition by the ignition plug 25, so as to improve fuel consumption and exhaust emission performance. However, with the compression-ignition combustion, the speed of the combustion becomes excessively rapid as the engine load increases, causing a problem of combustion noises, etc. Therefore, with the engine 1, within a high engine load range where the engine load is relatively high, the compression-ignition combustion is suspended and is switched to a spark-ignition combustion using the ignition plug 25. As described above, the engine 1 is configured to switch a combustion mode according to the operating state of the engine 1, particularly according to the load of the engine 1, between a CI (Compression-Ignition) mode where the compression-ignition combustion is performed and an SI (Spark-Ignition) mode where the spark-ignition combustion is performed. Note that the boundary of switching the mode is not limited to the example in the illustration. Moreover, as described later, the engine 1 is configured to switch the mode under various circumstances according to its operating state, other than the level of the engine load.

Figure 5A:
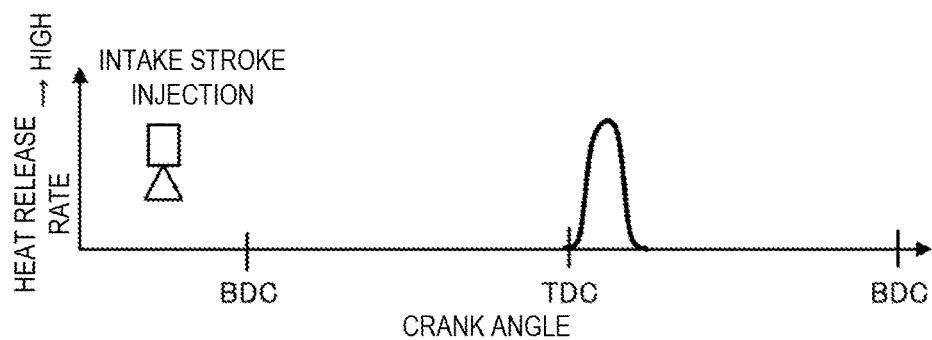
FIG. 5A illustrates one example of a fuel injection timing in a case where an intake stroke injection is performed in a compression-ignition (CI) mode and a heat release rate of CI combustion accompanied by the intake stroke injection.

The CI mode is divided into two ranges according to the level of the engine load. Specifically, within a range (1) where the engine load is low to medium within the CI mode, hot EGR gas with relatively high temperature is introduced into the cylinder 18 to improve ignitability and stability of the compression-ignition combustion. This is achieved by turning the exhaust VVL 71 on and performing the exhaust open-twice control of opening the exhaust valve 22 during the intake stroke. The introduction of the hot EGR gas increases the in-cylinder temperature at the end of the compression stroke, and is advantageous in improving the ignitability and the stability of the compression-ignition combustion within the range (1). Moreover, within the range (1), as illustrated in FIG. 5A, the injector 67 injects the fuel into the cylinder 18 at least in a period from the intake stroke to the middle stage of the compression stroke, and thus homogeneous mixture gas is formed. Within the range (1), the air-fuel ratio of the mixture gas is basically set to the theoretical air-fuel ratio (A/F=14.7±0.5, an air excess ratio $\lambda \approx 1$). Note that, as indicated by the dashed-line in FIG. 4, within a part of the range (1) where the engine load and the engine speed are relatively low, the air-fuel ratio of the mixture gas is set leaner than the theoretical air-fuel ratio.

Thus, within the range (1), the mixture gas inside the combustion chamber 19 is compressed to self-ignite near the CTDC as illustrated in FIG. 5A.

In the CI mode, within a range (2) where the engine load is higher than the range (1), the air-fuel ratio of the mixture gas is set to the theoretical air-fuel ratio ($\lambda \approx 1$). By setting to the theoretical air-fuel ratio, the three-way catalyst can be used and, as described later, the air-fuel ratio of the mixture gas becomes the theoretical air-fuel ratio also in the SI mode. Thus, the control performed when switching between the SI mode and the CI mode is simplified, and moreover, it contributes to expanding the range of the CI mode to the higher engine load side.

Moreover, within the range (2), since the in-cylinder temperature naturally increases according to the increase of the engine load, the hot EGR gas amount is reduced to avoid pre-ignition. This reduction is achieved by adjusting the internal EGR gas amount introduced into the cylinder 18. Moreover, by adjusting the amount of external EGR gas bypassing the EGR cooler 52, the amount of hot EGR gas may be adjusted.

Furthermore, within the range (2), cooled EGR gas with a relatively low temperature is introduced into the cylinder 18. Thus, by introducing the hot EGR gas with a high temperature and the cooled EGR gas with a low temperature into the cylinder 18 at a suitable ratio, the in-cylinder temperature at the end of the compression stroke is adjusted suitably, rapid combustion is avoided while securing the ignitability of the compression-ignition, and the compression-ignition combustion is stabilized.

Figure 5B:
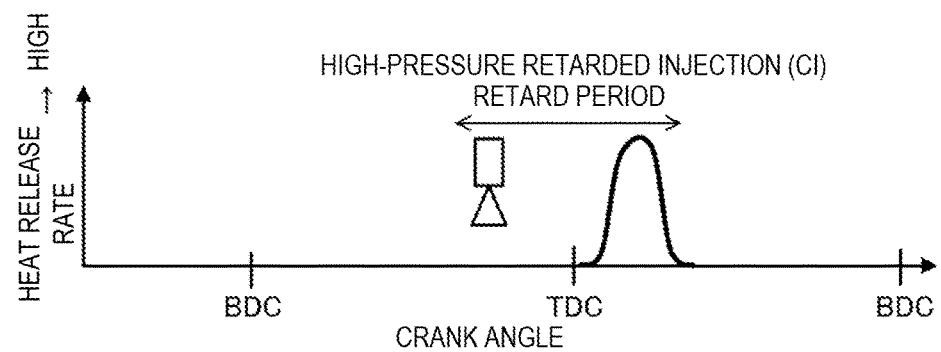
FIG. 5B illustrates one example of a fuel injection timing in a case where a high pressure retarded injection is performed in the CI mode and a heat release rate of the CI combustion accompanied by the high pressure retarded injection.

Thus, within the range (2) including the switching boundary between the CI mode and the SI mode, although the in-cylinder temperature is decreased, the in-cylinder temperature may further increase at the end of the compression stroke. If the fuel is injected into the cylinder 18 in the period from the intake stroke to the middle stage of the compression stroke similarly to the range (1), it may cause abnormal combustion (e.g., pre-ignition). On the other hand, if a large amount of cooled EGR gas with a low temperature is introduced to decrease the in-cylinder temperature at the end of the compression stroke, then the ignitability of the compression-ignition will degrade. In other words, since the compression-ignition combustion cannot be performed stably only by controlling the in-cylinder temperature, within the range (2), by adjusting the fuel injection mode in addition to the in-cylinder temperature control, the compression-ignition combustion can be stabilized while avoiding abnormal combustion (e.g., pre-ignition). Specifically, in this fuel injection mode, as illustrated in FIG. 5B, the fuel is injected into the cylinder 18 at least in a period from the late stage of the compression stroke and the early stage of expansion stroke (hereinafter, referred to as the retard period) at a significantly higher fuel pressure compared to the conventional mode. Hereinafter, this characteristic fuel injection mode is referred to as the "high pressure retarded injection" or simply "retarded injection." By the high pressure retarded injection, the compression-ignition combustion can be stabilized while avoiding the abnormal combustion within the range (2). The details of the high pressure retarded injection will be described later.

While the CI mode has the two divided ranges according to the level of the engine load, the SI mode is divided into two ranges (3) and (4) according to the level of engine speed. When the operating range of the engine 1 is divided into two high and low speed ranges, in FIG. 4, the range (3) corresponds to the low speed range and a lower load part of the high speed range, and the range (4) corresponds to a higher load part of the high speed range. Note that the boundary between the ranges (3) and (4) is not limited to the illustration.

In each of the ranges (3) and (4), the mixture gas is set to the theoretical air-fuel ratio ($\lambda \approx 1$) similarly to the range (2). Therefore, the air-fuel ratio of the mixture gas is fixed at the theoretical air-fuel ratio ($\lambda \approx 1$) over the boundary between the CI mode and the SI mode. Moreover, in the SI mode (i.e., the ranges (3) and (4)), the throttle valve 36 is basically fully opened and the fresh air amount and the external EGR gas amount to be introduced into the cylinder 18 are adjusted by controlling an opening of the EGR valve 511. Note that even within the range of the SI mode, within a part of the range where the engine load is relatively low, the throttle valve 36 may be throttled. The adjustment of the ratio of gas introduced into the cylinder 18 reduces a pumping loss, and by introducing a large amount of EGR gas into the cylinder 18, the temperature of the spark-ignition combustion is suppressed low and cooling loss can be reduced. Within the ranges of the SI mode, the external EGR gas cooled mainly by passing through the EGR cooler 52 is introduced into the cylinder 18. This becomes advantageous in avoiding abnormal combustion as well as suppressing generation of raw NOx. Note that, within a full engine load range, the EGR valve 511 is fully closed to cancel the external EGR.

Note that, within the range of the SI mode, the fresh air amount introduced into the cylinder 18 may be adjusted to set the air-fuel ratio to the theoretical air-fuel ratio ($\lambda \approx 1$) by controlling the opening of the throttle valve 36 according to the fuel injection amount while suspending the introduction of the EGR gas.

The geometric compression ratio of the engine 1 is, as described above, set to 15:1 or above (e.g., 18:1). Since a high compression ratio increases the in-cylinder temperature and the in-cylinder pressure at the end of the compression stroke, it is advantageous in stabilizing the compression-ignition combustion in the CI mode, especially within a low engine load part of the range of the CI mode (e.g., the range (1)). Whereas, in the SI mode corresponding to the high engine load range, in a high compression ratio engine 1 there arises a problem in that abnormal combustion (e.g., pre-ignition and knocking) easily occurs.

Figure 5C:
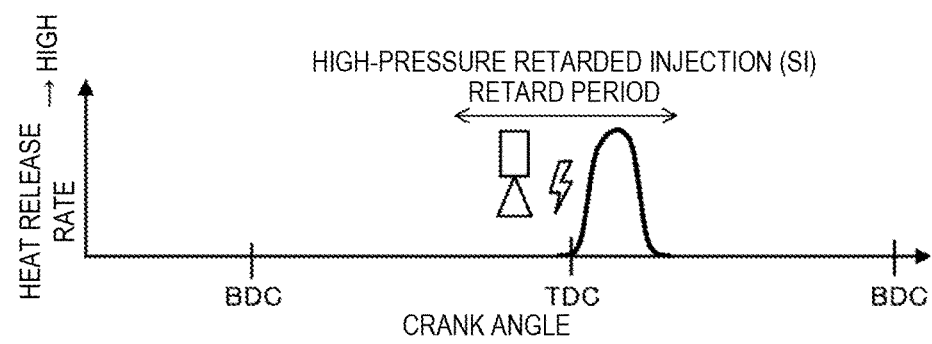
FIG. 5C illustrates one example of a fuel injection timing and an ignition timing in a case where the high pressure retarded injection is performed in a spark-ignition (SI) mode and a heat release rate of the SI combustion accompanied by the high pressure retarded injection.
Figure 5D:
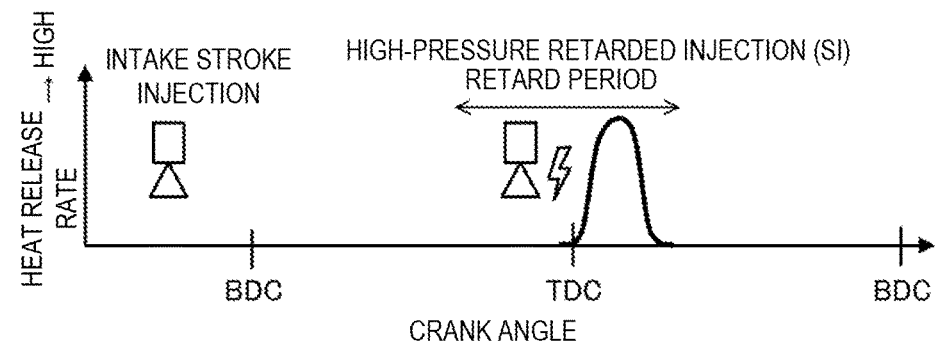
FIG. 5D illustrates one example of a fuel injection timing and an ignition timing in a case where split injections of the intake stroke injection and the high pressure retarded injection are performed in the SI mode and a heat release rate of the SI combustion accompanied by the split injections.

Thus, with the engine 1, the high pressure retarded injection is performed within the ranges (3) and (4) of the SI mode to avoid abnormal combustion. Specifically, within the range (3), at a high fuel pressure of 30 MPa or above, as illustrated in FIG. 5C, only the high pressure retarded injection of injecting the fuel into the cylinder 18 is performed in the retard period from the late stage of the compression stroke to the early stage of the expansion stroke. On the other hand, within the range (4), as illustrated in FIG. 5D, part of the fuel injected is injected into the cylinder 18 in an intake stroke period where the intake valve 21 opens, and the rest of the fuel injected is injected into the cylinder 18 in the retard period. In other words, within the range (4), a split injection of the fuel is performed. Here, the intake stroke period where the intake valve 21 opens is a period defined based on open and close timings of the intake valve, and not a period defined based on the piston position. Here, the end of the intake stroke may vary with respect to the timing at which the piston reaches an intake bottom dead center (IBDC) depending on the close timing of the intake valve 21 which is changed by the VVL 73 and the VVT 72.

Next, the high pressure retarded injection in the SI mode is described with reference to FIG. 6, which shows a composite chart comparing differences in a heat release rate (upper chart) and an extent of reaction of unburned mixture gas (lower chart) between an SI combustion caused by the high pressure retarded injection described above (solid line) and the conventional SI combustion in which the fuel injection is performed during the intake stroke (dashed line). The lateral axis in FIG. 6 indicates the crank angle. The comparison is performed under a condition that the operating state of the engine 1 is within the lower engine speed range with a high engine load (i.e., the range (3)), and a fuel amount injected is the same between the SI combustion caused by the high pressure retarded injection and the conventional SI combustion.

First, for the conventional SI combustion, a predetermined amount of fuel is injected into the cylinder 18 during the intake stroke (dashed line in the upper chart). After the fuel injection, comparatively homogeneous mixture gas is formed inside the cylinder 18 before the piston 14 reaches the CTDC. Further, in this case, the ignition is performed at a predetermined timing indicated by the first white circle after the CTDC to start the combustion. After the combustion starts, as indicated by the dashed line in the upper chart of FIG. 6, the combustion ends after progressing through a peak in the heat release rate. A period from the start of the fuel injection until the end of the combustion corresponds to a reactable time length of unburned mixture gas (hereinafter, may simply be referred to as the reactable time length) and, as indicated by the dashed line in the lower chart of FIG. 6, the reaction of the unburned mixture gas gradually progresses within the reactable time length. The dotted line in the lower chart indicates an ignition threshold (i.e., a reactivity of the unburned mixture gas being ignited). The conventional SI combustion is performed within the low engine speed range and it has an extremely long reactable time length. The reaction of the unburned mixture gas keeps progressing for the reactable time length, and therefore, the reactivity of the unburned mixture gas exceeds the ignition threshold around the ignition timing, causing abnormal combustion (e.g., pre-ignition and knocking).

On the other hand, the high pressure retarded injection aims to avoid abnormal combustion by shortening the reactable time length. As illustrated in FIG. 6, the reactable time length in this case is a total time length of a period where the injector 67 injects the fuel ((1) an injection period), a period from the end of the injection until combustible mixture gas is formed around the ignition plug 25 ((2) a mixture gas forming period), and a period from the start of the combustion started by the ignition until the combustion ends ((3) a combustion period), in other words, (1)+(2)+(3). The high pressure retarded injection shortens each of the injection period, the mixture gas forming period, and the combustion period, and thereby, shortens the reactable time length. The methods of shortening the periods are explained sequentially below.

First, a high fuel pressure relatively increases the fuel amount injected from the injector 67 per unit time. Therefore, in a case where the fuel injection amount is fixed, a relationship between the fuel pressure and the injection period of the fuel substantially becomes as follows: the injection period extends as the fuel pressure decreases, and the injection period contracts as the fuel pressure increases. Therefore, the high pressure retarded injection in which the fuel pressure is set significantly higher than the conventional pressure shortens the injection period.

Further, the high fuel pressure is advantageous in atomizing the fuel spray injected into the cylinder 18 and further extends a spreading distance of the fuel spray. Therefore, a relationship between the fuel pressure and a fuel vaporization time length substantially becomes as follows: the fuel vaporization time length extends as the fuel pressure decreases, and the fuel vaporization time length contracts as the fuel pressure increases. Further, a relationship between the fuel pressure and a time length for the fuel spray to reach around the ignition plug 25 (the fuel spray reaching time length) substantially becomes as follows: the fuel spray reaching time length extends as the fuel pressure decreases, and the fuel spray reaching time length contracts as the fuel pressure increases. The mixture gas forming period corresponds to a total time length of the fuel vaporization time length and the fuel spray reaching time length that is required for the fuel to reach around the ignition plug 25; therefore, the mixture gas forming period contracts as the fuel pressure increases. Therefore, the high pressure retarded injection in which the fuel pressure is set significantly higher than the conventional pressure shortens the fuel vaporization time length and the fuel spray reaching time length required to reach around the ignition plug 25 and, as a result, shortens the mixture gas forming period. On the other hand, as indicated by the white circles of the chart in FIG. 6, with the conventional intake stroke injection with the low fuel pressure, the mixture gas forming period is significantly longer. Note that, in the SI mode, the combination of the multi hole injector 67 and the cavity 141 shortens the time length from the end of the fuel injection until the fuel spray reaches around the ignition plug 25 and, as a result, becomes advantageous in shortening the mixture gas forming period.

As described above, shortening the injection period and the mixture gas forming period enables retarding the injection timing of the fuel, more precisely, retarding the injection start timing, to a comparatively late timing. Therefore, with the high pressure retarded injection, as illustrated in the upper chart of FIG. 6, the fuel injection is performed within the retard period from the late stage of the compression stroke to the early stage of the expansion stroke. Although turbulence of flow inside the cylinder becomes stronger and a turbulence kinetic energy inside the cylinder 18 increases due to injecting the fuel into the cylinder 18 at the high fuel pressure, the high turbulence kinetic energy is advantageous in shortening the combustion period, in combination with retarding the fuel injection timing to the comparatively late timing.

In other words, in a case where the fuel injection is performed within the retard period, a relationship between the fuel pressure and the turbulence kinetic energy within the combustion period substantially becomes as follows: the turbulence kinetic energy decreases as the fuel pressure decreases, and the turbulence kinetic energy increases as the fuel pressure increases. Here, even if the fuel is injected into the cylinder 18 at the high fuel pressure, in the case where the injection timing is on the intake stroke, due to the time length until the ignition timing being long and the inside of the cylinder 18 being compressed on the compression stroke after the intake stroke, the turbulence inside the cylinder 18 is subsided. As a result, in the case where the fuel injection is performed during the intake stroke, the turbulence kinetic energy within the combustion period becomes comparatively low regardless of the fuel pressure.

A relationship between the turbulence kinetic energy within the combustion period and the combustion period substantially becomes as follows: the combustion period extends as the turbulence kinetic energy decreases and the combustion period contracts as the turbulence kinetic energy increases. Therefore, a relationship between the fuel pressure and the combustion period becomes as follows: the combustion period extends as the fuel pressure decreases and the combustion period contracts as the fuel pressure increases. In other words, the high pressure retarded injection shortens the combustion period. On the other hand, with the conventional intake stroke injection with the low fuel pressure, the combustion period extends. Note that the multi hole injector 67 is advantageous in increasing the turbulence kinetic energy inside the cylinder 18 and shortening the combustion period. Moreover, it is also advantageous in shortening the combustion period to keep the fuel spray contained within the cavity 141 by the combination of the multi hole injector 67 and the cavity 141.

Figure 6:
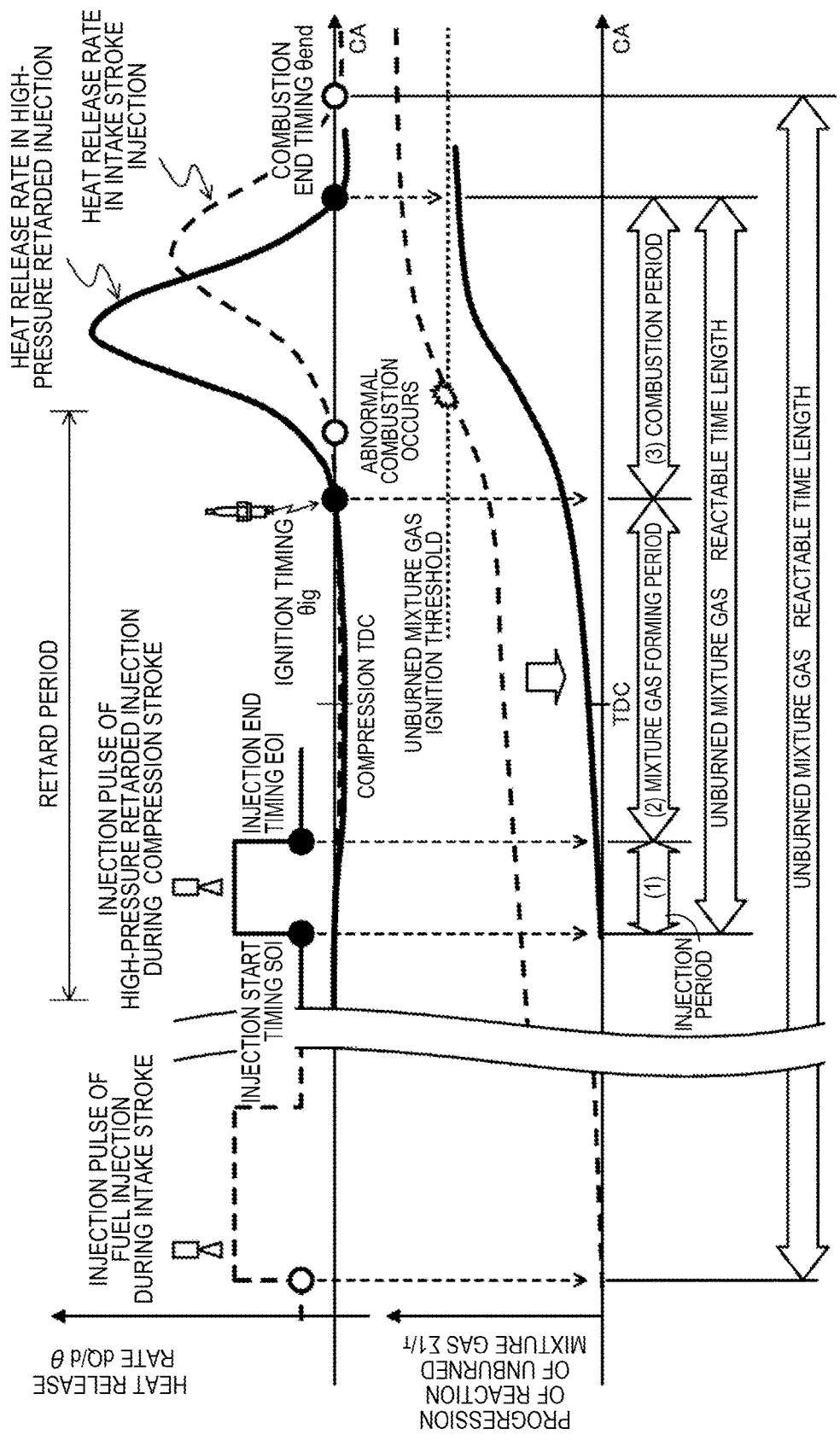
FIG. 6 is a composite chart comparing between a state of the SI combustion caused by the high pressure retarded injection and a state of the conventional SI combustion.

As above, the high pressure retarded injection shortens each of the injection period, the mixture gas forming period, and the combustion period, and as a result, as illustrated in FIG. 6, the high pressure retarded injection can significantly shorten the reactable time length of the unburned mixture gas from a fuel injection start timing SOI to a combustion end timing θend compared to the conventional case where the fuel injection is performed during the intake stroke. As a result of shortening the reactable time length, as illustrated in the upper chart of FIG. 6, while the extent of reaction of the unburned mixture gas at the end of the combustion exceeds the ignition threshold and abnormal combustion occurs with the conventional intake stroke injection with the low fuel pressure as indicated by the white circle, with the high pressure retarded injection, as indicated by the black circle, the progression of the reaction of the unburned mixture gas at the end of the combustion is suppressed and abnormal combustion can be avoided. Note that the ignition timings for the cases indicated by the white and black circles in the upper chart of FIG. 6 are set at the same timing.

By setting the fuel pressure to, for example, 30 MPa or above, the combustion period can effectively be shortened. Moreover, the fuel pressure of 30 MPa or above can also effectively shorten the injection period and the mixture gas forming period. Note that the fuel pressure may be suitably set according to a type of fuel used which at least contains gasoline. The upper limit value of the fuel pressure may be 120 MPa, etc.

The high pressure retarded injection avoids the occurrence of abnormal combustion in the SI mode by adjusting the mode of the fuel injection into the cylinder 18. Alternatively to such high pressure retarded injection, a conventionally known method for avoiding abnormal combustion is by retarding the ignition timing. The retarded ignition timing suppresses the increase in the temperature and the pressure of the unburned mixture gas and, thereby, suppresses the progression of the reaction of the unburned mixture gas. However, while the retarded ignition timing causes degradation of the thermal efficiency and reduction of the torque, in the case of performing the high pressure retarded injection, since abnormal combustion is avoided by adjusting the mode of the fuel injection, the ignition timing can be advanced, and thus, the thermal efficiency can be improved and the torque can be increased. In other words, the high pressure retarded injection can not only avoid abnormal combustion, but also enable advancing the ignition timing accordingly, and thereby, is advantageous in improving fuel consumption.

As described above, the high pressure retarded injection in the SI mode can shorten each of the injection period, the mixture gas forming period, and the combustion period, while the high pressure retarded injection performed within the range (2) of the CI mode can shorten the injection period and the mixture gas forming period. In other words, by injecting the fuel at the high fuel pressure into the cylinder 18 to increase the turbulence inside the cylinder 18, the atomized fuel is more finely mixed, and even when the fuel injection is performed at the late timing near the CTDC, the comparatively homogeneous mixture gas can swiftly be formed.

With the high pressure retarded injection in the CI mode, by injecting the fuel at the late timing near the CTDC within the comparatively high engine load range, substantially homogeneous mixture gas is swiftly formed as described above while preventing pre-ignition in, for example, a compression stroke period. Therefore, after the CTDC, the compression-ignition can surely be performed. Further, by performing the compression-ignition combustion in an expansion stroke period where the pressure inside the cylinder 18 gradually decreases as the crankshaft rotates, the combustion subsides, and an excessive increase of the pressure (dP/dθ) inside the cylinder 18 due to the compression-ignition combustion can be avoided. Thus, a restriction due to noise, vibration, and harshness (NVH) is lifted and, as a result, the CI mode applicable range extends to the high load range side.

Back to the SI mode, as described above, the high pressure retarded injection in the SI mode shortens the reactable time length of the unburned mixture gas by performing the fuel injection in the retard period; however, although the shortening of the reactable time length is advantageous within the low engine speed range where the engine speed is comparatively low because the actual reactable time length against the crank angle change is long, within the high engine speed range where the engine speed is comparatively high, since the actual reactable time length against the crank angle change is short, it is less advantageous. On the other hand, with the retarded injection, since the fuel injection timing is set to near the CTDC, on the compression stroke, the in-cylinder gas that does not include the fuel, in other words, air at a high specific heat ratio, is compressed. As a result, within the high engine speed range, the in-cylinder temperature at the end of the compression stroke becomes high, and this increased in-cylinder temperature at the end of the compression stroke may cause knocking. Therefore, when only performing the retarded injection within the range (4) where the engine load and the engine speed are high and the fuel amount injected increases, there may be a case where it is required to retard the ignition timing to avoid knocking.

Therefore, within the range (4) where the engine speed is relatively high and the engine load is high in the SI mode as illustrated in FIG. 4, part of the fuel injected is injected into the cylinder 18 in the intake stroke period and the rest of the fuel injected is injected into the cylinder 18 in the retard period, as illustrated in FIG. 5D. With the intake stroke injection, the specific heat ratio of the in-cylinder gas on the compression stroke (i.e., the mixture gas including the fuel) may be reduced to suppress the in-cylinder temperature at the end of the compression stroke. By decreasing the in-cylinder temperature at the end of the compression stroke as above, knocking can be suppressed and, therefore, the ignition timing can be advanced.

Moreover, by performing the high pressure retarded injection, as described above, the turbulence inside the cylinder 18 (in the combustion chamber 19) near the CTDC becomes strong, and the combustion period becomes shorter. This shorter combustion period is also advantageous in suppressing knocking, and the ignition timing can further be advanced. Thus, within the range (4), by performing the split injection including the intake stroke injection and the high pressure retarded injection, the thermal efficiency can be improved while avoiding abnormal combustion.

Note that instead of performing the high pressure retarded injection, a multi-point ignition system may be adopted to shorten the combustion period within the range (4). Specifically, a plurality of ignition plugs are arranged to be oriented toward the inside of the combustion chamber 19, and within the range (4), the intake stroke injection is performed and each of the plurality of ignition plugs is controlled to perform a multi-point ignition. In this case, since a flame spreads from each of the plurality of fire sources inside the combustion chamber 19, the flame spreads rapidly and the combustion period becomes shorter. As a result, the combustion period is shortened similarly to when adopting the high pressure retarded injection, and this shortened combustion period is advantageous in improving the thermal efficiency.

(Control When Switching from SI Mode to CI Mode)

Since spark-ignition combustion has a low thermal efficiency compared to compression-ignition combustion, the combusting gas temperature is relatively high with the spark-ignition combustion. On the other hand, in the CI mode where the compression-ignition combustion is performed, since the ignitability of the compression-ignition is secured as described above, at least the internal EGR gas is introduced into the cylinder 18 to increase the temperature inside the cylinder 18.

Immediately after the SI mode where the combusting gas temperature is relatively high is switched to the CI mode, since the state inside the cylinder 18 is a high temperature environment and the exhaust gas with high temperature caused by the spark-ignition combustion is introduced into the cylinder 18, the compression-ignition combustion is performed while the temperature inside the cylinder 18 is high. In this case, if the fuel is injected into the cylinder 18 at a comparatively early timing (e.g., during the intake stroke), the pre-ignition is caused in the compression stroke period, and the pressure increase rate (dP/dθ) inside the cylinder 18 may become significantly high and cause loud combustion noises.

Therefore, with the engine 1, a transition control for avoiding the pre-ignition when switching from the SI mode to the CI mode and avoiding the increase in combustion noises is performed.

Here, in the operation map in the warmed-up state illustrated in FIG. 4, the switch from the SI mode to the CI mode may correspond to shifting from the high engine load range where the load of the engine 1 corresponds to the SI mode to the low engine load range where the load of the engine 1 corresponds to the CI mode. In other words, due to the reduction of the load of the engine 1, the SI mode is switched to the CI mode. Note that, near the boundary between the SI and CI modes, the SI mode may be switched to the CI mode in the state where the load of the engine 1 is stable.

Moreover, in a cold-start or a warming-up state where the temperature of the engine 1 is below a predetermined temperature, since the compression-ignition combustion is not stable, the CI mode is not performed (not illustrated), and the SI mode is performed instead in the entire operating range of the engine 1. On the other hand, as illustrated in FIG. 4, the CI mode is performed in the warmed-up state where the temperature of the engine 1 is above the predetermined temperature. Therefore, the SI mode may be switched to the CI mode while the engine load is stable according to the temperature of the engine 1 increasing to the warmed-up state.

Moreover, in view of the combustion stability, since the engine 1 is in the SI mode in an idle state, when shifting from the idle state to the low engine load range where the CI mode is performed, the switch is performed from the low engine load range of the SI mode to the low engine load range of the CI mode. Additionally, the engine 1 is configured to execute a fuel cut while the vehicle decelerates. Since the in-cylinder temperature decreases during the fuel cut, immediately after resuming from the fuel cut, there are cases where the compression-ignition combustion cannot be performed. Therefore, with the engine 1 of this embodiment, immediately after resuming from the fuel cut, the mode is set to the SI mode even within the range of the CI mode to secure the combustion stability, and when the in-cylinder temperature increases to shift to the normal CI mode thereafter, the switch is performed from the low engine load range of the SI mode to the low engine load range of the CI mode. As described above, the switch from the low engine load range of the SI mode to the low engine load range of the CI mode, in other words, the switch from the SI mode to the CI mode without a substantial change in the load of the engine 1, is performed under various circumstances.

Figure 7:
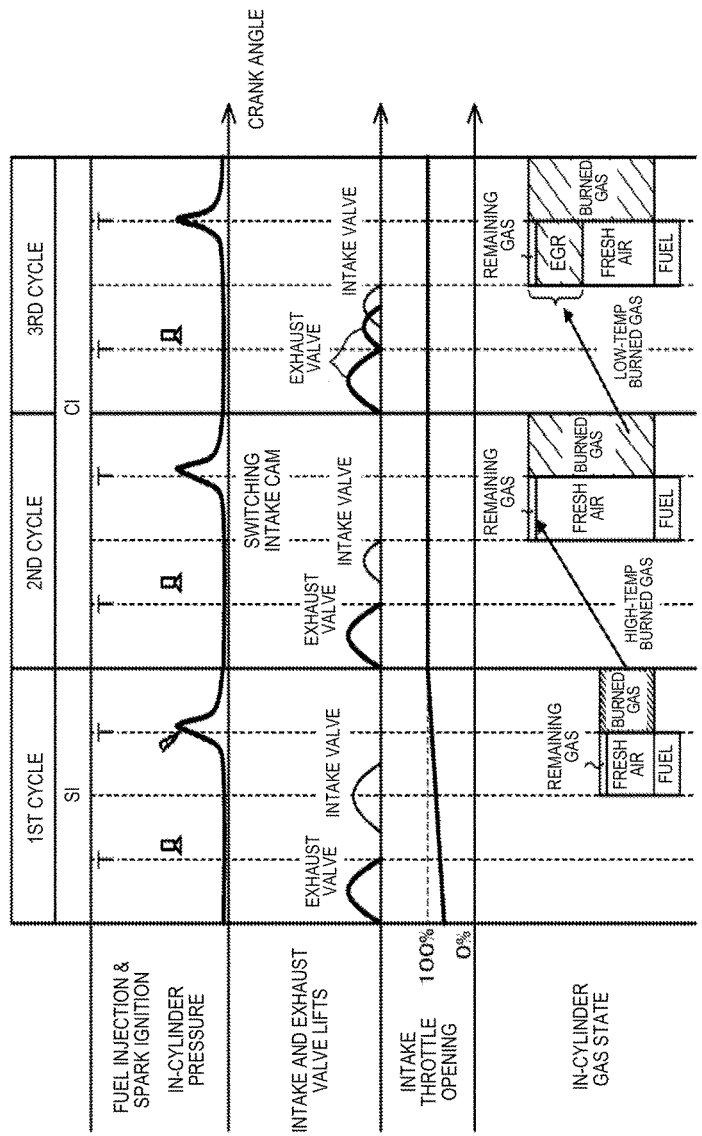
FIG. 7 is a time chart for describing a transition control performed when switching from a low engine load range of the SI mode to a low engine load range of the CI mode.

FIG. 7 is a time chart for a transition control performed when switching from the low engine load range of the SI mode to the low engine load range of the CI mode. Specifically, FIG. 7 illustrates one example of a change of the fuel injection timing and the spark-ignition timing, a change of the in-cylinder pressure, a change of the open state of the intake and exhaust vales, a change of the opening of the throttle valve, and a change of a gas state inside the cylinder, when switching from the SI mode to the CI mode. Here, the crank angle (i.e., time) progresses in the direction from left to right of the time chart in FIG. 7. Note that the change of the fuel injection timing, the spark-ignition timing, and the in-cylinder pressure illustrated in FIG. 7 are merely examples for describing this embodiment, and it is not limited to the illustrated timings (similar to FIG. 8, etc.).

First, in the first cycle corresponding to the leftmost part in FIG. 7, the engine is operated in the low engine load range of the SI mode, and here, the fuel is injected in the intake stroke period and the spark-ignition is performed near the CTDC. The first cycle corresponds to a first stage of the transition control. In the first cycle, the air-fuel ratio of the mixture gas is set to the theoretical air-fuel ratio ($\lambda \approx 1$), and in order to adjust the fresh air amount to meet the fuel injection amount, the intake VVL 73 controls the intake valve 21 to be operated with the large lift cam and the VVT 72 sets the close timing of the intake valve 21 to a late timing after the IBDC. By closing the intake valve 21 at the late timing, the fresh air amount is regulated (see the gas state inside the cylinder illustrated in the lowest row of FIG. 7). Moreover, in the example of FIG. 7, in the first cycle, the amount of fresh air cannot be regulated sufficiently by the control of the intake valve 21 alone and is compensated by throttling the throttle valve 36. Note that the throttle valve 36 is gradually opened further to prepare for switching to the CI mode where the throttle valve is set to be fully opened. Moreover, in the first cycle corresponding to the low engine load range of the SI mode, the external EGR gas is not introduced. Furthermore, the exhaust VVL 71 is turned off, in other words, the internal EGR gas is also not introduced. Thus, in the first cycle where the spark-ignition combustion is performed, the exhaust gas temperature becomes high (high-temperature burned gas), but both the external and internal EGR gases are not introduced into the cylinder 18. Therefore, in the following second cycle, the exhaust gas is substantially not introduced into the cylinder 18.

The second cycle corresponds to a cycle in which the SI mode is switched to the CI mode, and also corresponds to a second stage of the transition control (i.e., transition mode). Here, the throttle valve is fully opened and the intake VVL 73 switches the operating cam from the large lift cam to the small lift cam. Note that the VVT 72 is not actuated here, and the phase of the intake valve 21 is not changed. Thus, the close timing of the intake valve 21 is instantly switched to near the IBDC, and as a result, the amount of fresh air to be introduced into the cylinder 18 increases. The open and close timings of the intake valve 21 here correspond to the timings in the exhaust open-twice control described later.

On the other hand, the amount of fuel injected by the injector 67 is set approximately the same as that in the first cycle. In the second cycle, the A/F of the mixture gas is set significantly leaner compared to the first cycle (i.e., the theoretical air-fuel ratio) by the increased amount of fresh air. Note that the timing of the fuel injection, as exemplary illustrated in FIG. 7, is set to be during the intake stroke, and thus, comparatively homogeneous lean mixture gas is formed within the cylinder 18.

Thus, in the second cycle, the ignition plug 25 is not actuated and the mixture gas leaner than the theoretical air-fuel ratio is compressed to self-ignite near the CTDC. By making the mixture gas lean, the gas amount with respect to the fuel amount increases. Therefore, such lean mixture gas is advantageous in decreasing the combusting gas temperature. Since the combusting gas temperature is decreased compared to the spark-ignition combustion even by performing the compression-ignition combustion, the exhaust gas temperature discharged after the combustion in the second cycle is significantly decreased. Note that in the gas state illustrated in the lowest row of FIG. 7, the relative temperature of the "burned gas" is indicated by the pitch width of the hatching pattern, in which the narrow pitch width indicates that the burned gas temperature is high and the wide pitch width indicates that the burned gas temperature is low.

The following third cycle corresponds to the cycle immediately after switching from the SI mode to the CI mode. In other words, the third cycle corresponds to a third stage of the transition control. In the third cycle, the exhaust open-twice control is performed by turning the exhaust VVL 71 on. Thus, a part of the burned gas produced by the compression-ignition combustion in the second cycle is introduced into the cylinder 18; however, as described above, since the burned gas temperature is suppressed to a low temperature and the in-cylinder temperature in the second cycle is also suppressed to a low temperature, the in-cylinder temperature in the third cycle does not become significantly high. Moreover, in the third cycle, since the intake valve 21 still has a small lift and the throttle valve 36 is fully opened, the same as in the second cycle, as illustrated in FIG. 7, the fresh air amount is reduced by the amount of the internal EGR gas introduced into the cylinder 18. As a result, the A/F of the mixture gas in the third cycle becomes richer than that in the second cycle. The A/F of the mixture gas in the third cycle may be set to the theoretical air-fuel ratio or leaner than the theoretical air-fuel ratio according to the operating state of the engine 1. Note that also in the third cycle, the fuel injection timing is set to be during the intake stroke.

Thus, also in the third cycle, similarly to the second cycle, the ignition plug 25 is not actuated. As described above, in the third cycle, since the in-cylinder temperature does not increase excessively, by injecting the fuel during the intake stroke, the comparatively homogeneous mixture gas formed within the cylinder 18 is surely compressed to ignite near the CTDC and stably combusts without causing pre-ignition. Thus, the increase in combustion noises immediately after switching from the SI mode to the CI mode is avoided. After the third cycle where the switching from the SI mode to the CI mode is completed, a combustion control according to the operating state of the engine 1 is performed.

Figure 8:
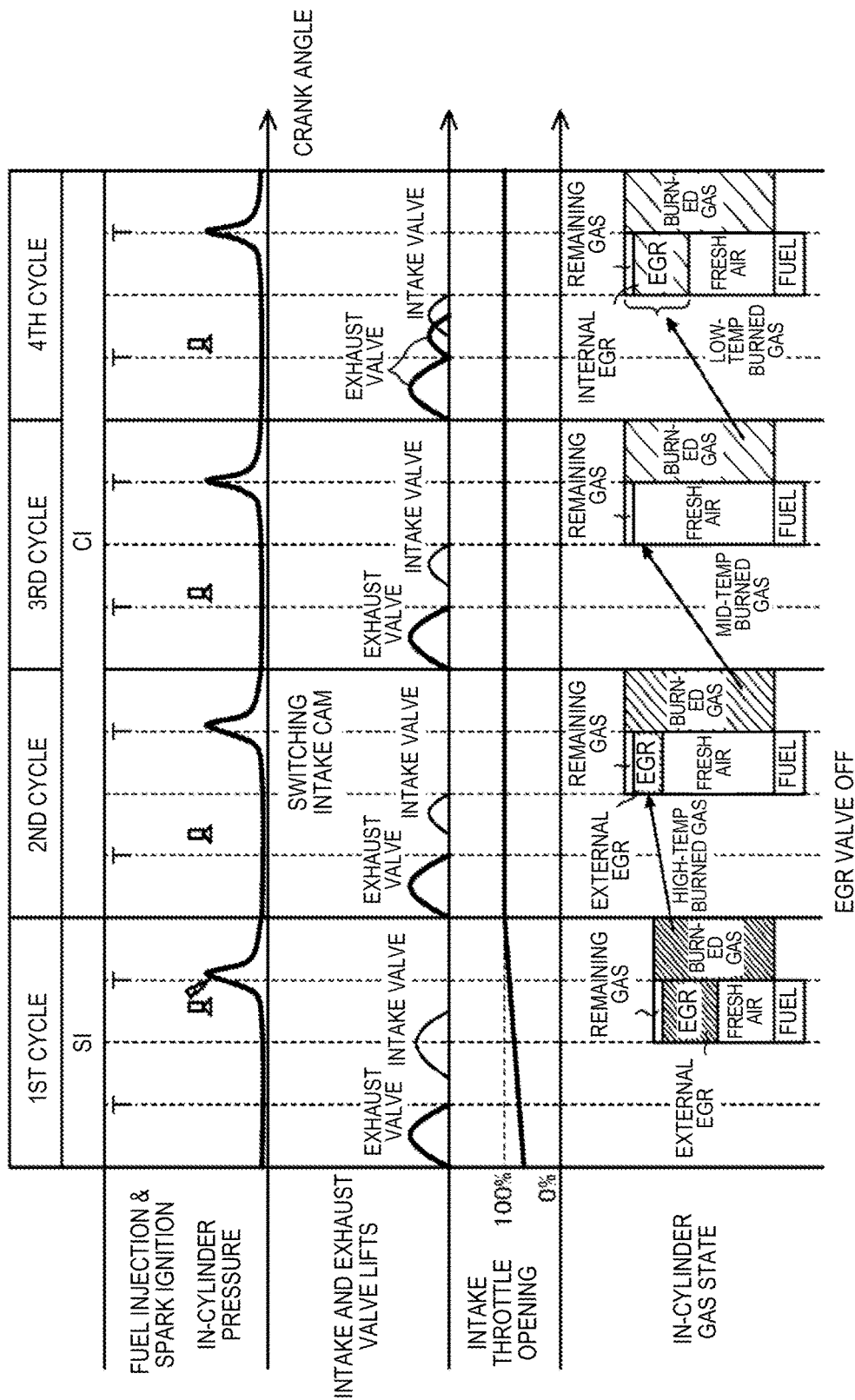
FIG. 8 is a time chart for describing a transition control performed when switching from a high engine load range of the SI mode to the low engine load range of the CI mode.

FIG. 8 is a time chart for a transition control performed when switching from the high engine load range of the SI mode to the low engine load range of the CI mode. FIG. 8 illustrates one example of the transition from the range (3) (or the range (4)) in the SI mode to the range (1) (or the range (2)) in the CI mode in the operation map in the warmed-up state illustrated in FIG. 4.

In other words, in the first cycle corresponding to the leftmost part in FIG. 8, the engine is operated in the high engine load range of the SI mode, and here, the fuel is injected in a period from the late stage of the compression stroke to the early stage of the expansion stroke (i.e., the high pressure retarded injection) and the spark-ignition is performed near the CTDC. The air-fuel ratio of the mixture gas is set to the theoretical air-fuel ratio ($\lambda \approx 1$), and in order to adjust the fresh air amount to meet the fuel injection amount, the intake VVL 73 controls the intake valve 21 operated with the large lift cam and the VVT 72 sets the close timing of the intake valve 21 to a late timing after the IBDC. By closing the intake valve 21 at the late timing, the fresh air amount is regulated. Moreover, the first cycle in FIG. 8 is the same as the first cycle in FIG. 7 in the sense that the throttle valve 36 is throttled but it is gradually opened further to prepare for switching to the CI mode. Whereas, in the first cycle corresponding to the high engine load range of the SI mode, differently from the example of FIG. 7, the EGR valve 511 and/or the EGR cooler bypass valve 531 are opened to introduce the external EGR gas into the cylinder 18. Note that the exhaust VVL 71 is turned off and the internal EGR gas is not introduced. The first cycle in FIG. 8 corresponds to a first stage of the transition control. In the first cycle where the spark-ignition combustion is performed, the exhaust gas temperature may become high.

The following second cycle, similarly to FIG. 7, corresponds to a cycle in which the SI mode is switched to the CI mode, and also corresponds to a second stage of the transition control. Here, the throttle valve is fully opened, and the intake VVL 73 switches the operating cam from the large lift cam to the small lift cam. Thus, the close timing of the intake valve 21 is instantly switched to an early timing near the IBDC, and as a result, the amount of fresh air to be introduced into the cylinder 18 increases. Moreover, the EGR valve 511 and the EGR cooler bypass valve 531 are fully closed to stop the introduction of the external EGR gas into the cylinder 18. However, since the external EGR has low control responsiveness, even after the EGR valve 511 and the EGR cooler bypass valve 531 are fully closed, the exhaust gas with comparatively high temperature remaining in the EGR passage 50 is introduced into the cylinder 18 in the second cycle (see the gas state illustrated in the lowest row of FIG. 8).

The amount of the fuel injected by the injector 67 is set approximately the same as that in the first cycle. Thus, in the second cycle, the A/F of the mixture gas is set significantly leaner compared to that in the first cycle (i.e., the theoretical air-fuel ratio); however, the A/F tends toward the theoretical air-fuel ratio by the amount of the external EGR gas. Note that the timing of the fuel injection, as exemplary illustrated in FIG. 8, is set to be during the intake stroke, and thus, comparatively homogeneous lean mixture gas is formed.

Thus, in the second cycle, the ignition plug 25 is not actuated and the mixture gas leaner than the theoretical air-fuel ratio is compressed to self-ignite near the CTDC. Note that, as described above, the exhaust gas temperature may become slightly high due to the introduction of the external EGR gas into the cylinder 18. Here, for the sake of convenience of explanation, the burned gas is referred to as the mid-temperature burned gas to indicate that the burned gas has a temperature around the middle between the high-temperature burned gas and low-temperature burned gas. In the following third cycle, if the exhaust VVL 73 is turned on and a large amount of mid-temperature burned gas is introduced into the cylinder 18, the in-cylinder temperature may become excessively high.

Therefore, in the example of FIG. 8, the second stage is performed over a plurality of cycles. In other words, the third cycle where the exhaust VVL 71 is turned off is performed similarly to the second cycle. Therefore, the second and third cycles correspond to the second stage of the transition control. In the third cycle, since the exhaust gas does not remain in the EGR passage 50, the exhaust gas is not introduced into the cylinder 18. As a result, the A/F of the mixture gas becomes leaner than that in the second cycle. Thus, the temperature of the exhaust gas discharged by performing the compression-ignition combustion in the third cycle becomes lower than the second cycle (i.e., the low-temperature burned gas).

In the following fourth cycle, the exhaust VVL 71 is turned on to perform the exhaust open-twice control. Thus, a part of the burned gas produced by the compression-ignition combustion in the third cycle is introduced into the cylinder 18. In the fourth cycle, the fresh air amount is lower by the introduced amount of the internal EGR gas compared to the second and third cycles, and as a result, the A/F of the mixture gas becomes relatively rich. Thus, also in the fourth cycle, although the ignition plug 25 is not actuated and the compression-ignition combustion is performed, since the in-cylinder temperature does not become excessively high, the comparatively homogeneous and relatively rich mixture gas is surely compressed to ignite near the CTDC without being pre-ignited and stably combusts. As a result, the increase in combustion noises immediately after switching from the SI mode to the CI mode is avoided. The fourth cycle corresponds to a third stage of the transition control.

In the high engine load range of the SI mode, the in-cylinder temperature may become high due to the increase in fuel amount and the exhaust gas temperature may also become high. Thus, pre-ignition may easily occur particularly when switching from the high engine load range of the SI mode to the low engine load range of the CI mode; however, by performing the transition control illustrated in FIG. 8, pre-ignition can surely be avoided. Moreover, in switching from the high engine load range of the SI mode to the low engine load range of the CI mode, since a high torque is not required, in the second stage (i.e., the second and third cycles), the A/F of the mixture gas can be set significantly lean. This is more advantageous in sufficiently decreasing the exhaust gas temperature and avoiding combustion noises.

Figure 9:
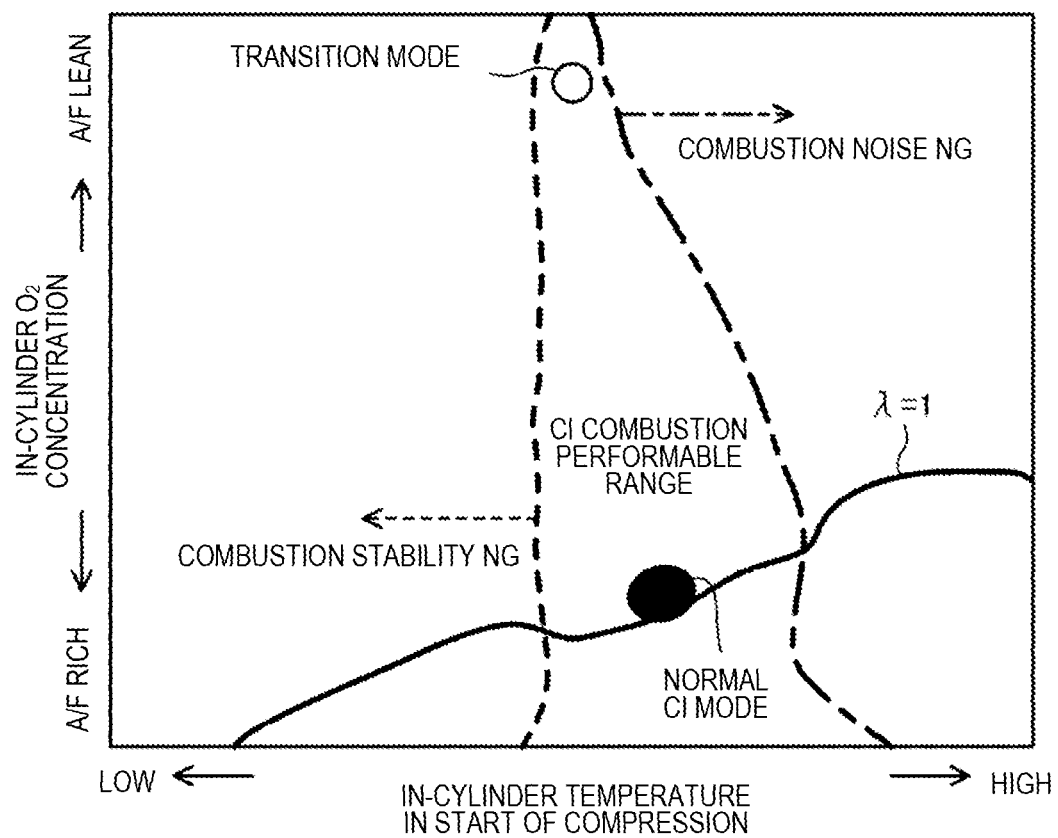
FIG. 9 is a chart for describing a combustion state relating to the transition control in a map of an in-cylinder temperature when starting compression and an in-cylinder $O_2$ concentration.

Here, FIG. 9 is a chart illustrating the combustion state in the CI mode in a map of the in-cylinder temperature in the start of the compression, and the in-cylinder $O_2$ concentration. In the chart, the horizontal axis indicates the in-cylinder temperature in the start of the compression, in which the temperature is higher as it goes rightward and the temperature is lower as it goes leftward. Additionally, the vertical axis indicates the in-cylinder $O_2$ concentration, in which the A/F of the mixture gas is leaner as it goes upward and the A/F of the mixture gas is richer as it goes downward. A range on the left side of the dashed line in FIG. 9 indicates that the in-cylinder temperature becomes excessively low and the combustion stability degrades, whereas a range on the right side of the unevenly dashed line in FIG. 9 indicates that the in-cylinder temperature becomes excessively high and combustion noises (i.e., dP/dθ) increase. Therefore, the range sandwiched by the dashed line and the unevenly dashed line is a range where the CI combustion can be performed. Moreover, the solid line in FIG. 9 indicates that the A/F of the mixture gas is at the theoretical air-fuel ratio (air excess ratio λ=1).

The combustion state in the SI mode before switching from the SI mode to the CI mode extends beyond the right part of the map in FIG. 9 because the in-cylinder temperature is high. Whereas, the transition mode corresponds to the part of the range indicated by the white circle in FIG. 9, in which a large amount of fresh air with comparatively low temperature is introduced into the cylinder 18 to lower the in-cylinder temperature in the start of the compression and make the A/F of the mixture gas lean, and thus, the combustion is performed within the CI combustion performable range. As described above, as a result of the decrease of the exhaust gas temperature in the transition mode, even if the internal EGR gas is introduced, the in-cylinder temperature before the start of the compression can be settled within the CI combustion performable range and the mixture gas which is relatively richer than the transition mode can be compressed to ignite and combust (see the "normal CI mode" indicated by the black circle in FIG. 9).

Figure 10:
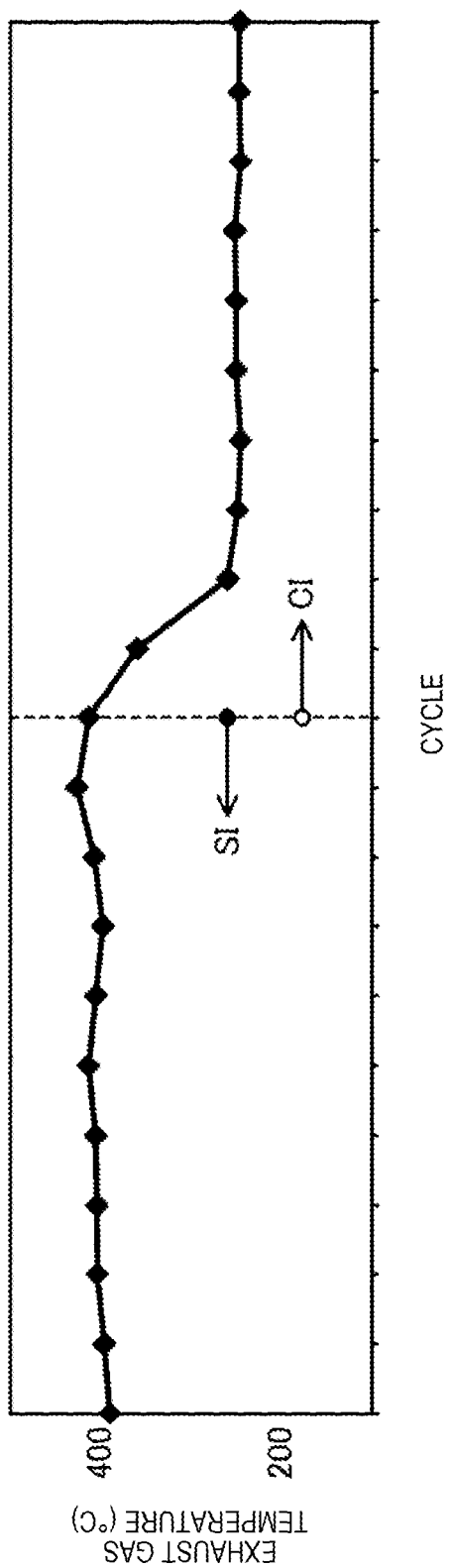
FIG. 10 is a chart exemplifying a change in an exhaust gas temperature during the transition control.

Accordingly, FIG. 10 is a chart exemplifying the change of the exhaust gas temperature when switching from the SI mode to the CI mode. The horizontal axis in FIG. 10 indicates the cycle, in which the SI combustion is performed at the dashed line and on the left side of the dashed line indicating the center of the chart, and the CI combustion is performed on the right side of the dashed line. In FIG. 10, the transition mode described above corresponds to the two cycles after switching to the CI combustion, and it can be understood that the exhaust gas temperature is decreased by close to 200° C. due to the performance of the transition mode. As a result, as described above, when switching from the SI mode to the CI mode, pre-ignition can be avoided and the increase in combustion noises can be avoided.

Figure 11:
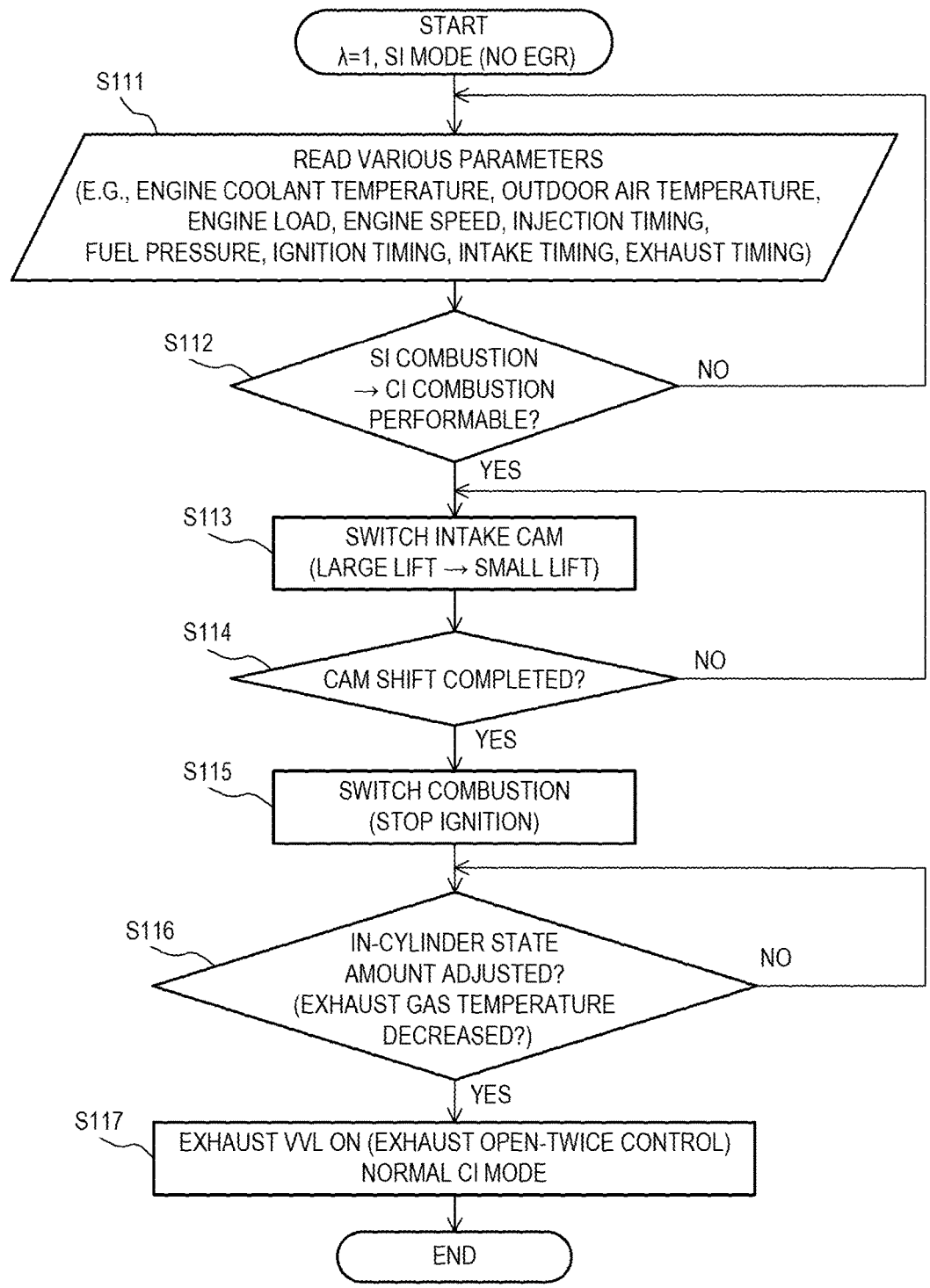
FIG. 11 is a flowchart for describing the transition control performed when switching from the low engine load range of the SI mode to the low engine load range of the CI mode

Next, regarding the transition control described above, a control flow performed by the PCM 10 is described with reference to FIGS. 11 and 12. FIG. 11 is the flowchart relating to the transition control when switching from the low engine load range of the SI mode to the low engine load range of the CI mode. The flow in FIG. 11 corresponds to the time chart in FIG. 7. The flow starts in the SI mode with the air excess ratio λ=1 (note that the external EGR gas is not introduced). At S111 after the start of the flow, the PCM 10 reads the various parameters (e.g., the engine coolant temperature, an outdoor air temperature, the engine load, the engine speed, the fuel injection timing, the fuel pressure, the ignition timing, the open and close timings of the intake valve, the open and close timings of the exhaust valve) to grasp the operating state of the engine 1. Then, at S112, the PCM 10 determines whether the SI mode can be switched to the CI mode. If the mode cannot be switched (i.e., S112: NO), the processing of S111 and S112 is repeated, whereas if the mode can be switched to the CI mode (i.e., S112: YES), the flow shifts to S113. Specifically, as described above, the result of the determination at S112 is YES when the engine 1 shifts from the cold-start to the warmed-up state, when the operating state of the engine 1 shifts from the idle state to the low engine load operating state other than the idle state, when the engine 1 shifts from the state where the SI mode is performed temporarily after resuming from the fuel cut, to the normal CI mode, etc. From the start of the flow to S112 corresponds to the first cycle in the time chart of FIG. 7, which corresponds to the first stage of the transition control.

At S113, the intake VVL 73 switches the operating cam from the large lift cam to the small lift cam (i.e., cam shift), and at S114, it is determined whether the cam shift is completed. If the cam shift is not completed (S114: NO), the processing of S113 is continued, and if the cam shift is completed (S114: YES), the flow shifts to S115. Note that the cam shift is performed substantially instantaneously. At S115, the ignition plug 25 is not actuated so as to switch from the SI mode to the CI mode.

Following S115, at S116, it is determined whether the in-cylinder state amount is adjusted, in other words, whether the exhaust gas temperature is decreased to a predetermined level. The determination here may be performed based on the exhaust gas temperature estimated by the PCM 10 with reference to the various read parameters. If the result of the determination at S116 is NO, the processing at S116 is continued, and if the result of the determination at S116 is YES, the flow shifts to S117. The processing from S113 to S116 corresponds to the second cycle in the time chart of FIG. 7, which corresponds to the second stage of the transition control. Therefore, the determination at S116 corresponds to determining the number of cycles corresponding to the second stage where the transition mode is performed. Specifically, in the example of FIG. 7, the second stage only corresponds to the second cycle; however, based on the exhaust gas temperature, the second stage (i.e., the transition mode) may be continued over a plurality of cycles.

Note that at S116, the number of cycles corresponding to the second stage is determined based on the estimated exhaust gas temperature; however, it may be configured such that by setting in advance the number of cycles where the transition mode is performed and storing it in the PCM 10 based on, for example, the operating state of the engine 1 slightly before or after the switching from the SI mode to the CI mode, the transition mode is continued over the set number of cycles at S116.

At S117 after S116, the exhaust VVL 71 is turned on to start the exhaust open-twice control. S117 corresponds to the third cycle in FIG. 7, which corresponds to the third stage of the transition control. Thus, the switch from the low engine load range of the SI mode to the low engine load range of the CI mode is complete.

Figure 12:
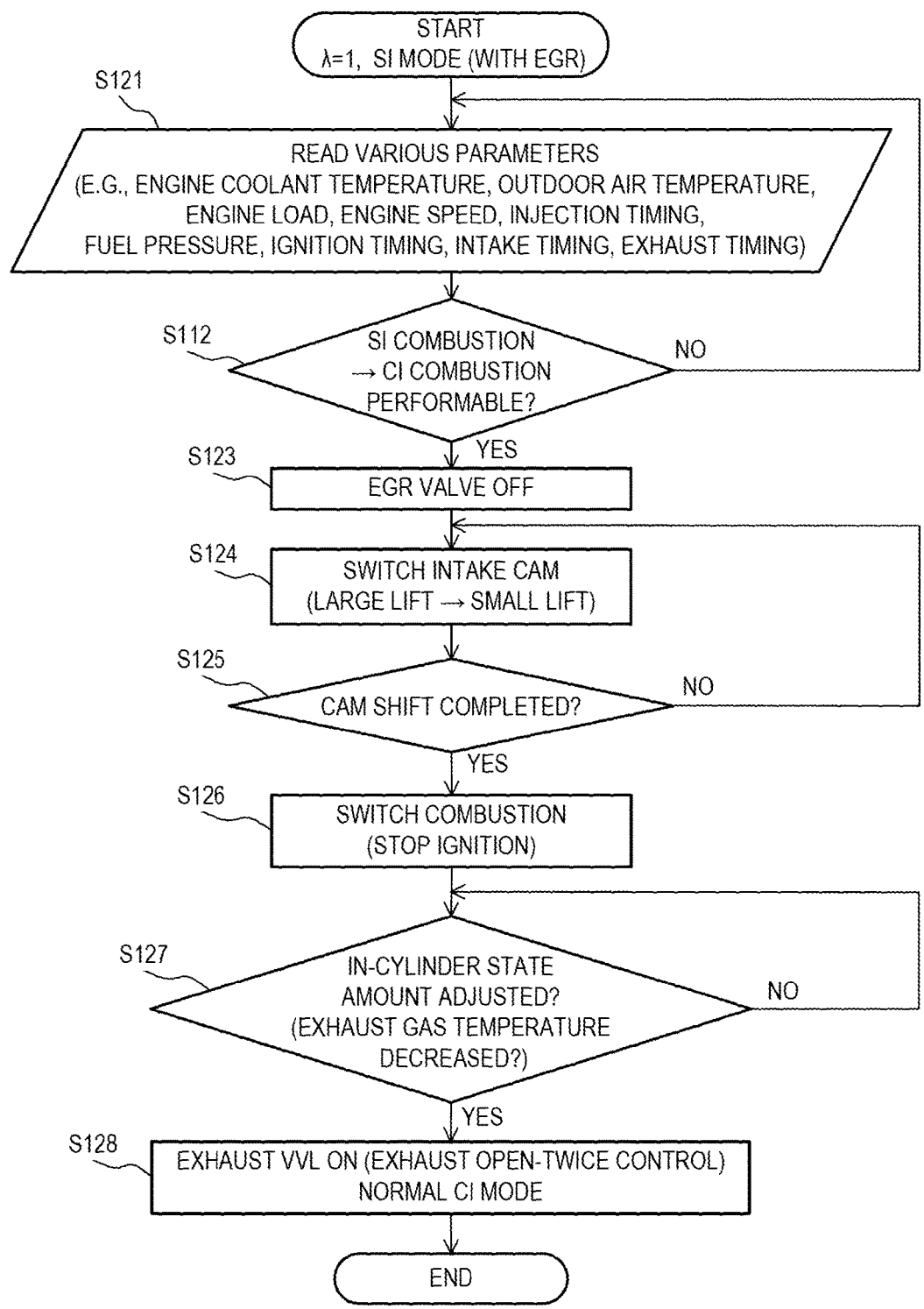
FIG. 12 is a flowchart for describing the transition control performed when switching from the high engine load range of the SI mode to the low engine load range of the CI mode.

FIG. 12 is the flowchart relating to switching from the high engine load range of the SI mode to the low engine load range of the CI mode. The flow corresponds to the time chart in FIG. 8. The flow in FIG. 12 starts at a state where the air excess ratio λ=1 in the SI mode and the external EGR gas is introduced. At S121 after the start of the flow, the PCM 10 reads the various parameters to grasp the operating state of the engine 1. Then, at S122, the PCM 10 determines whether to switch the SI mode to the CI mode. If the mode is not to be switched to CI mode (i.e., S122: NO), the processing of S121 and S122 is repeated, whereas if the mode is to be switched to the CI mode (i.e., S122: YES), the flow shifts to S123. From the start of the flow to S122 corresponds to the first cycle in the time chart of FIG. 8, which corresponds to the first stage of the transition control.

At S123, the EGR valve 511 and the EGR cooler bypass valve 531 are closed. Following S123, at S124, the intake VVL 73 switches the operating cam from the large lift cam to the small lift cam, and at S125, it is determined whether the cam shift is completed. If the cam shift is not completed (S125: NO), the processing of S124 is continued, and if the cam shift is completed (S125: YES), the flow shifts to S126. At S126, the ignition plug 25 is not actuated so as to switch from the SI mode to the CI mode.

Following S126, at S127, it is determined whether the in-cylinder state amount is adjusted (in other words, whether the exhaust gas temperature is reduced to a predetermined level). The processing from S123 to S127 corresponds to the second and third cycles in the time chart of FIG. 8, which corresponds to the second stage of the transition control. As described in the Detailed Description of Embodiment with reference to FIG. 8, when the external EGR gas is introduced into the cylinder 18 in the SI mode before the switch, the transition mode may be performed over a plurality of cycles. As described above, the determination at S127 may be performed based on the exhaust gas temperature estimated by the PCM 10. Alternatively, as described above, the number of cycles in which the transition mode is performed may be set in advance.

At S128, the exhaust VVL 71 is turned on to start the exhaust open-twice control. S128 corresponds to the fourth cycle in FIG. 8, which corresponds to the third stage of the transition control. Thus, the switch from the high engine load range of the SI mode to the low engine load range of the CI mode is complete.

Note that with the configuration described above, the valve operating mechanism of the intake valve 21 includes the VVL 73 which switches between the large lift cam and the small lift cam. The valve operating mechanism of the intake valve 21 may include, instead of the VVL, a CVVL (Continuous Variable Valve Lift) for continuously varying the lift. The CVVL can suitably adopt various known structures (detailed structure thereof is not illustrated). With the VVT and the CVVL, the open and close timings and the lift (and the open period) of the intake valve 21 can continuously be varied.

Figure 13:
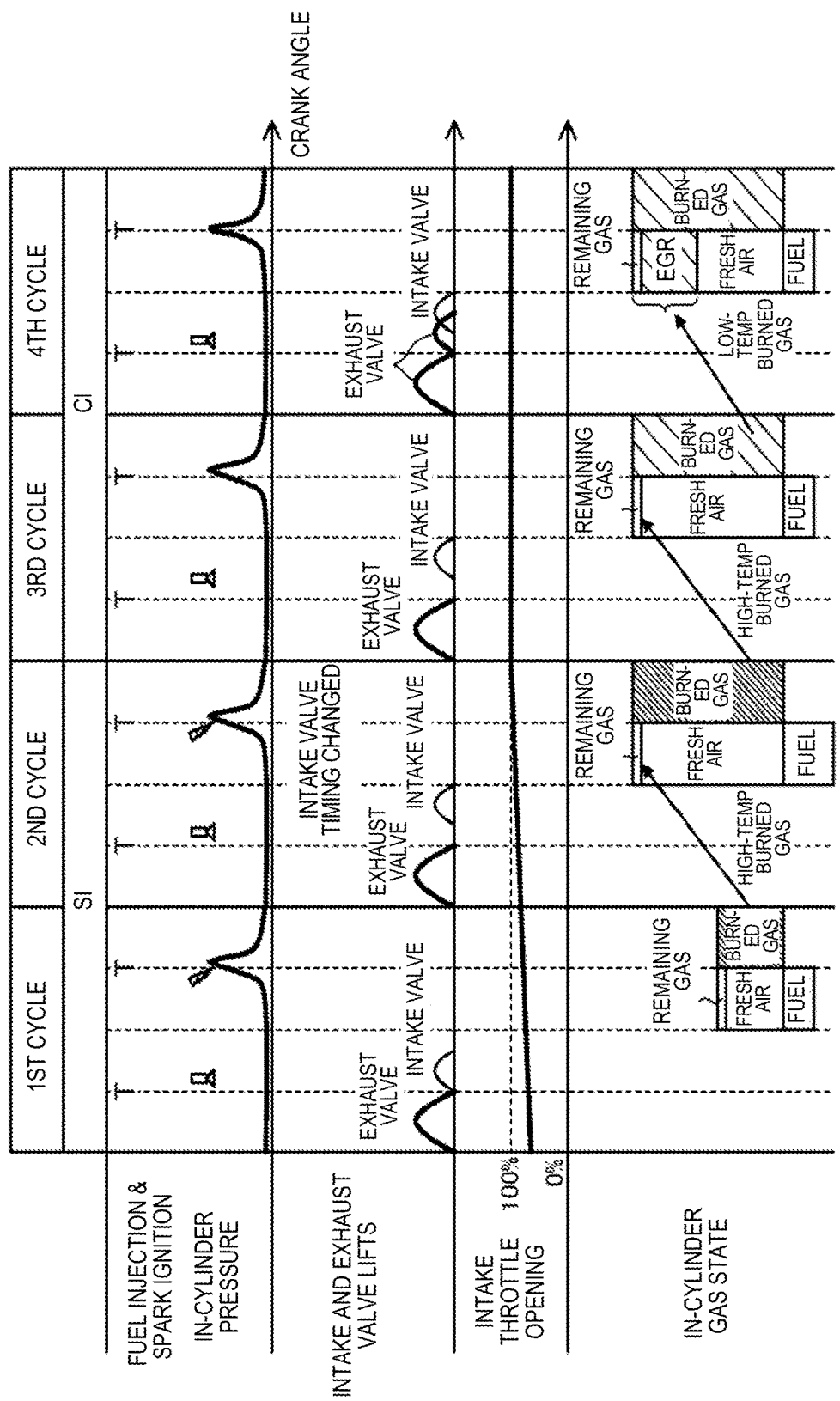
FIG. 13 is a time chart for describing another transition control performed when switching from the low engine load range of the SI mode to the low engine load range of the CI mode, different from FIG. 7.
Figure 14:
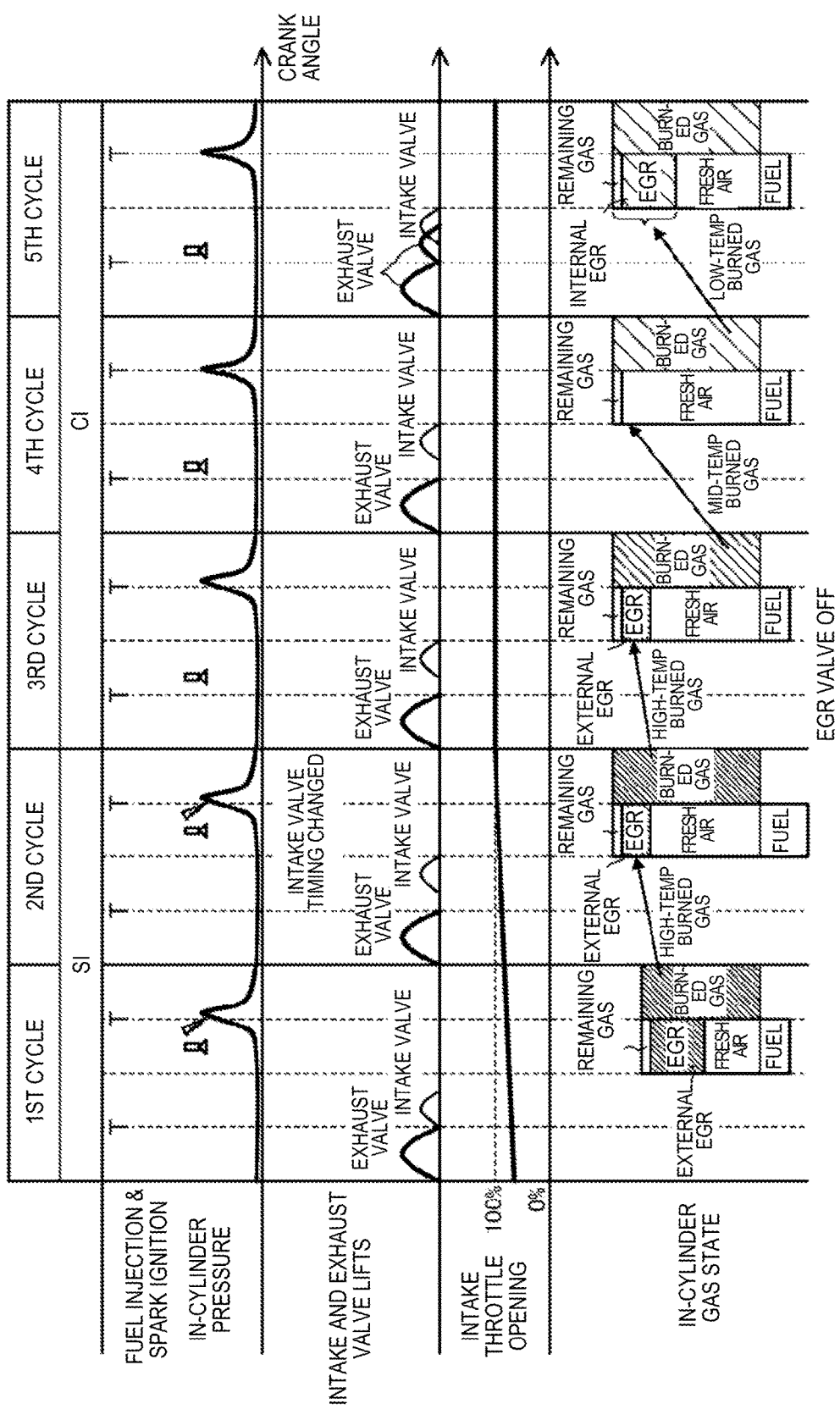
FIG. 14 is a time chart for describing another transition control performed when switching from the high engine load range of the SI mode to the low engine load range of the CI mode, different from FIG. 8.

FIGS. 13 and 14 are time charts illustrating the switch controls from the SI mode to the CI mode with the configuration in which the valve operating mechanism of the intake valve 21 includes the CVVL. FIG. 13 relates to the switch from the low engine load range of the SI mode to the low engine load range of the CI mode, which corresponds to FIG. 7. FIG. 14 relates to the switch from the high engine load range of the SI mode to the low engine load range of the CI mode, which corresponds to FIG. 8.

First, in the first cycle corresponding to the leftmost part in FIG. 13, the engine is operated in the low engine load range of the SI mode, and the air-fuel ratio of the mixture gas is set to the theoretical air-fuel ratio (λ≈1). In order to adjust the fresh air amount to meet the fuel injection amount, the CVVL of the intake valve 21 operates the intake valve 21 with comparatively small lift and the VVT 72 sets the close timing of the intake valve 21 to a comparatively early timing before the IBDC. By closing the intake valve 21 at the early timing, the fresh air amount is regulated. Moreover, in the first cycle, the amount of fresh air cannot be regulated sufficiently by the control of the intake valve 21 alone, and is compensated by throttling the throttle valve 36. Note that the throttle valve 36 is gradually opened further to prepare for switching to the CI mode where the throttle valve is set to be fully opened. Moreover, in the first cycle corresponding to the low engine load range of the SI mode, the external EGR gas is not introduced. Furthermore, the exhaust VVL 71 is turned off.

In the second cycle, although the SI mode is continued, the VVT 72 is actuated to retard the close timing of the intake valve 21 to prepare for performing the exhaust open-twice control after switching to the CI mode. Due to the close timing being retarded, since the amount of fresh air to be introduced into the cylinder 18 is increased compared to the first cycle, in the second cycle, the theoretical air-fuel ratio is maintained by increasing the fuel injection amount. Thus, in the second cycle where the SI mode is continued, a three-way catalyst can be used such that the degradation of the exhaust emission performance is avoided. Moreover, in order to maintain the same torque with respect to the increase in fuel injection amount, in the second cycle, the spark-ignition timing may be retarded compared to that in the first cycle. In the second cycle, similarly to the first cycle, the exhaust gas temperature becomes comparatively high. In the time chart of FIG. 13, the first and second cycles correspond to the first stage of the transition control.

The third cycle corresponds to a cycle in which the SI mode is switched to the CI mode (the second stage and the transition mode). Here, the throttle valve is fully opened, and the operation of the ignition plug 25 is stopped. Moreover, the amount of the injection by the injector 67 is reduced to be about the same as that in the first cycle. As a result, since the fresh air amount is increased while the fuel amount is substantially the same compared to the first cycle where the air-fuel ratio is set to the theoretical air-fuel ratio, the air-fuel ratio of the mixture gas becomes leaner than the theoretical air-fuel ratio. Similarly, since the fuel amount is reduced compared to the second cycle where the air-fuel ratio is set to the theoretical air-fuel ratio, the air-fuel ratio of the mixture gas becomes leaner even when compared to the second cycle. Thus in the third cycle, by compressing the homogeneous mixture gas leaner than the first and second cycles to ignite and combust, the exhaust gas temperature is decreased.

Then, in the following fourth cycle, the exhaust VVL 71 is turned on to start the exhaust open-twice control, and the exhaust gas with comparatively low temperature is introduced into the cylinder 18. Thus, the A/F of the mixture gas is enriched more than that in the third cycle to stably perform the compression-ignition combustion. The fourth cycle corresponds to the third stage of the transition control.

Next, in the first cycle corresponding to the leftmost part in FIG. 14, the engine is operated in the high engine load range of the SI mode and the air-fuel ratio of the mixture gas is set to the theoretical air-fuel ratio (λ≈1). In order to adjust the fresh air amount to meet the amount of the fuel injected by the retarded injection, the CVVL of the intake valve 21 operates the intake valve 21 with comparatively small lift and the VVT 72 sets the close timing of the intake valve 21 to a comparatively early timing before the IBDC. Thus, the fresh air amount is regulated. Moreover, in the first cycle, the external EGR gas is introduced into the cylinder 18. Furthermore, the exhaust VVL 71 is turned off.

In the second cycle, similarly to the second cycle in FIG. 13, the SI mode is continued and the close timing of the intake valve 21 is retarded to prepare for the exhaust open-twice control. The fuel injection amount is increased to meet the fresh air amount increased due to the retarded close timing. Thus, also in the second cycle, the air-fuel ratio of the mixture gas is set to the theoretical air-fuel ratio. Therefore, also in FIG. 14, the first and second cycles correspond to the first stage of the transition control.

The third cycle corresponds to a cycle in which the SI mode is switched to the CI mode (the second stage, the transition mode). Here, both the EGR valve 511 and the EGR cooler bypass valve 531 are closed and the operation of the ignition plug 25 is stopped. Moreover, the amount of the fuel injected by the injector 67 is reduced to be substantially the same as that in the first cycle. As a result, the air-fuel ratio of the mixture gas in the third cycle becomes leaner than the theoretical air-fuel ratio. Thus, in the third cycle, by compressing the homogeneous mixture gas which is leaner than the first and second cycles to ignite and combust, the exhaust gas temperature is decreased. Note that in FIG. 14, the external EGR gas is introduced in the first and second cycles, and the burned gas remaining in the EGR passage 50 is introduced into the cylinder 18 even after both the EGR valve 511 and the EGR cooler bypass valve 531 are closed. As a result, the exhaust gas temperature is not sufficiently decreased. Therefore, the transition mode is performed also in the following fourth cycle so as to continue the second stage. Thus, the temperature of the exhaust gas is sufficiently decreased so that when the exhaust VVL 71 is turned on to start the exhaust open-twice control in the following fifth cycle, the compression-ignition combustion can be performed stably by introducing the exhaust gas with low temperature into the cylinder 18 without causing pre-ignition. The fifth cycle corresponds to the third stage of the transition control.

As described above, also with the valve operating mechanism of the intake valve 21 including the CVVL, a similar transition control including the first, second, and third stages can be performed. Note that the VVL 73 can instantly switch the stage of the transition control from the first stage to the second stage, and is excellent in view of improving responsiveness of the transition control and switching of the mode smoothly.

Note that the application of the art disclosed herein is not limited to the engine configuration described above. For example, the fuel injection in the intake stroke period may be performed into the intake port 16 by a port injector separately provided in the intake port 16, instead of the injector 67 provided in the cylinder 18.

Moreover, the engine 1 is not limited to the in-line four cylinder engine described above, and may be applied to an in-line three cylinder engine, an in-line two cylinder engine, an in-line six cylinder engine, etc. Further, the engine 1 is applicable to various kinds of engines, such as a V6 engine, a V8 engine, and a flat-four engine.

Moreover, the operating ranges illustrated in FIG. 4 are merely an example, and other various operating ranges may be provided.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

DESCRIPTION OF REFERENCE CHARACTERS

1 Engine (Engine Body)
10 PCM (Controller)
18 Cylinder
21 Intake Valve
22 Exhaust Valve
25 Ignition Plug
50 EGR Passage (External EGR Adjusting Part)
51 Main Passage (External EGR Adjusting Part)
511 EGR Valve (External EGR Adjusting Part)
52 EGR Cooler (External EGR Adjusting Part)
53 EGR Cooler Bypass Passage (External EGR Adjusting Part)
531 EGR Cooler Bypass Valve (External EGR Adjusting Part)
67 Injector (Fuel Injection Valve)
71 Exhaust VVL (Internal EGR Adjusting Part)

What is claimed is:
1. A control device of a spark-ignition engine, comprising:
a main body of the engine having a cylinder;
a fuel injection valve for injecting fuel to be supplied into the cylinder;
an ignition plug for igniting mixture gas within the cylinder;
a controller for operating the engine by controlling at least the fuel injection valve and the ignition plug; and
an internal exhaust gas recirculation (EGR) adjuster for adjusting an exhaust gas amount remaining within the cylinder in a period from exhaust stroke to intake stroke during a compression-ignition mode by controlling at least one of an exhaust valve and an intake valve provided in the main body of the engine,
wherein according to an operating state of the engine, the controller switches an ignition mode between the compression-ignition mode in which compression-ignition combustion is performed by causing the mixture gas to self-ignite and combust, and a spark-ignition mode in which spark-ignition combustion is performed by igniting the mixture gas with the ignition plug to combust the mixture gas,
wherein the controller switches the ignition mode from the spark-ignition mode to the compression-ignition mode by performing in order, a first stage where an air-fuel ratio of the mixture gas is set to a predetermined value and the spark-ignition combustion is performed, a second stage where the air-fuel ratio of the mixture gas is set leaner than the first stage and the compression-ignition combustion is performed, and a third stage where the air-fuel ratio of the mixture gas is set richer than the second stage and the compression-ignition combustion is performed, and wherein in the first and second stages, the controller operates the internal EGR adjuster to maintain an operating state of the internal EGR adjuster just prior to the first stage in which spark-ignition is performed, and in the third stage, the controller operates the internal EGR adjuster to increase the exhaust gas amount remaining within the cylinder to an amount that is greater than the exhaust gas amount remaining within the cylinder in the second stage.

2. The control device of claim 1, further comprising an intake valve operating mechanism for operating an intake valve provided in the main body of the engine,
wherein the intake valve operating mechanism is operated in either one of a first mode in which the intake valve is opened and closed with a first lift property and a second mode in which the intake valve is opened and closed with a second lift property, the first lift property with which a fresh air amount is relatively regulated, the second lift property with which the fresh air amount is increased compared to that with the first lift property, and
wherein the controller increases an amount of intake air into the cylinder by operating the intake valve in the first mode in the first stage and operating the intake valve in the second mode in the second stage.

3. The control device of claim 2, further comprising an internal exhaust gas recirculation (EGR) adjuster for adjusting an exhaust gas amount remaining within the cylinder in a period from exhaust stroke to intake stroke by controlling at least one of an exhaust valve and the intake valve provided in the main body of the engine,
wherein in the first and second stages, the controller stops the operation of the internal EGR adjuster to reduce the exhaust gas amount remaining within the cylinder, and in the third stage, the controller operates the internal EGR adjuster to increase the exhaust gas amount remaining within the cylinder.

4. The control device of claim 1, wherein the controller sets the air-fuel ratio of the mixture gas to a theoretical air-fuel ratio in the spark-ignition mode including the first stage.

5. The control device of claim 1, wherein the controller performs the first to third stages in this order in a case of switching from the spark-ignition mode where an engine load is at a predetermined high load, to the compression-ignition mode where the engine load is lower than the predetermined high load.

6. The control device of claim 1, wherein the controller performs the first to third stages in this order in a case of switching from the spark-ignition mode where an engine load is at a predetermined low load, to the compression-ignition mode where the engine load is at the predetermined low load.

7. The control device of claim 1, further comprising an external exhaust gas recirculation (EGR) adjuster for circulating exhaust gas discharged from the cylinder to the intake side,
wherein when switching from the spark-ignition mode where the external EGR adjuster is operated to the compression-ignition mode, the controller stops the operation of the external EGR adjuster in the second stage and increases the number of engine cycles of the second stage compared to that when switching from the spark-ignition mode where the external EGR adjuster is not operated to the compression-ignition mode.

8. The control device of claim 7, wherein when the engine load is at a predetermined low load, the controller controls the ignition mode to be the spark-ignition mode where the external EGR adjuster is not operated, and when the engine load is at a predetermined high load, the controller controls the ignition mode to be the spark-ignition mode where the external EGR adjuster is operated.

\* \* \* \* \*